United States Patent
Murakami et al.

(10) Patent No.: US 11,501,640 B2
(45) Date of Patent: Nov. 15, 2022

(54) PROCESSING DEVICE, PROCESSING METHOD, AND PROCESSING PROGRAM

(71) Applicant: TOYOTA JIDOSHA KABUSHIKI KAISHA, Toyota (JP)

(72) Inventors: Kunihiro Murakami, Okazaki (JP); Katsuhiko Sakakibara, Kariya (JP); Makoto Matsushita, Ichinomiya (JP); Junya Sato, Nagoya (JP); Kiyonori Yoshida, Toyota (JP); Tae Sugimura, Miyoshi (JP); Takashi Hayashi, Aichi-gun (JP); Jun Endo, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 438 days.

(21) Appl. No.: 16/779,698

(22) Filed: Feb. 3, 2020

(65) Prior Publication Data
US 2020/0273335 A1 Aug. 27, 2020

(30) Foreign Application Priority Data
Feb. 27, 2019 (JP) .............................. JP2019-034730

(51) Int. Cl.
*G05D 1/00* (2006.01)
*G08G 1/01* (2006.01)
(Continued)

(52) U.S. Cl.
CPC .......... *G08G 1/127* (2013.01); *G05D 1/0022* (2013.01); *G05D 1/0027* (2013.01);
(Continued)

(58) Field of Classification Search
CPC .... G08G 1/127; G08G 1/0112; G08G 1/0965; G08G 1/205; G05D 1/0022;
(Continued)

(56) References Cited

U.S. PATENT DOCUMENTS 7,515,560 B2 * 4/2009 DuMas ................. H04W 12/06
 455/518
7,894,843 B2 * 2/2011 Smart .................... G06F 1/1656
 362/18

(Continued)

FOREIGN PATENT DOCUMENTS

JP 2010-020371 A 1/2010

*Primary Examiner* — Frederick M Brushaber
(74) *Attorney, Agent, or Firm* — Oblon, McClelland, Maier & Neustadt, L.L.P.

(57) ABSTRACT

Disclosed is a processing device that is mounted in a vehicle and is able to perform communication with a center server during a normal time. The processing device includes a controller configured to execute searching for one or a plurality of other vehicles with which a host vehicle is able to perform communication, in emergency where a situation of emergency occurs and communication with the center server is disrupted, inquiring the other vehicles searched by the search about whether or not to enable intervention control related to the situation, and deciding a center vehicle giving an instruction related to the intervention control from among the other vehicles replying to enable the intervention control and the host vehicle.

8 Claims, 16 Drawing Sheets

(51) Int. Cl.
*H04W 4/46* (2018.01)
*G08G 1/127* (2006.01)

(52) U.S. Cl.
CPC ......... *G05D 1/0055* (2013.01); *G08G 1/0112* (2013.01); *H04W 4/46* (2018.02); *G05D 2201/0213* (2013.01)

(58) Field of Classification Search
CPC ............... G05D 1/0027; G05D 1/0055; G05D 2201/0213; H04W 4/46; H04W 4/90; H04W 4/44; H04W 4/021; H04W 4/024; H04W 4/025; B60W 50/00
See application file for complete search history.

(56) References Cited

U.S. PATENT DOCUMENTS

| | | | | |
|---|---|---|---|---|
| 2002/0103622 | A1* | 8/2002 | Burge | G16Z 99/00 |
| | | | | 702/183 |
| 2007/0105528 | A1* | 5/2007 | Haas | H04W 76/50 |
| | | | | 455/466 |
| 2007/0218869 | A1* | 9/2007 | Thijs | G08B 25/016 |
| | | | | 455/404.2 |
| 2018/0345907 | A1* | 12/2018 | Tamane | B60R 25/209 |

\* cited by examiner

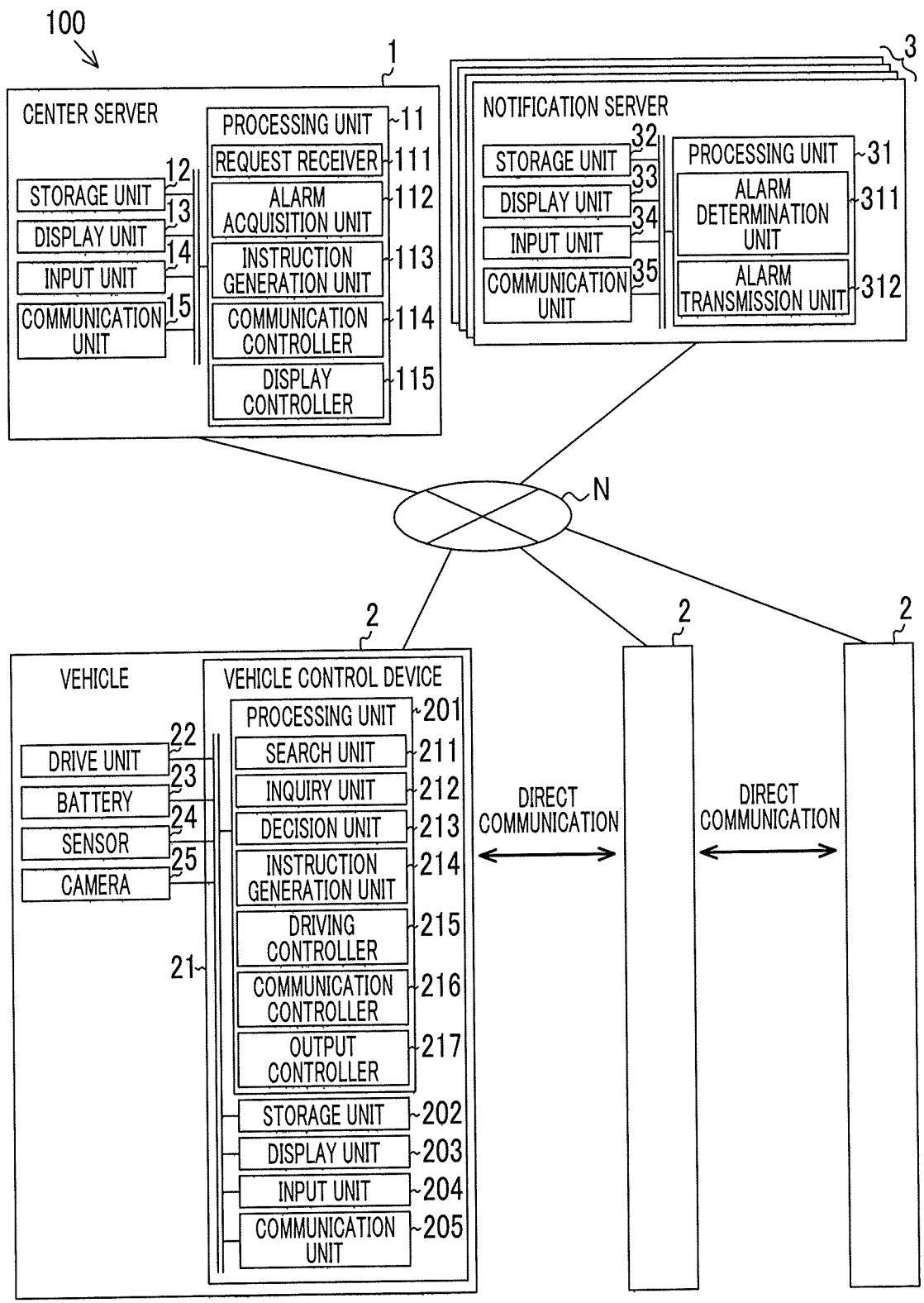

FIG. 2

| VEHICLE ID | POSITIONAL INFORMATION (LATITUDE AND LONGITUDE) |
|---|---|
| AX120258 | (35.685···, 139.775···) |
| AX120259 | (35.685···, 139.775···) |
| AX120260 | (35.686···, 139.774···) |
| : | : |

FIG. 3

| VEHICLE ID | RESOURCE INFORMATION | | | | | | |
|---|---|---|---|---|---|---|---|
| | LOAD | FUEL | BATTERY | ELECTRIC POWER GENERATION EQUIPMENT | DISPLAY DEVICE | SPEAKER | ··· |
| AX120258 | WATER AND BLANKET | GASOLINE 35 L | - | - | FOUR SURFACES OF UPPER PORTION | 30 W × 4 | ··· |
| AX120259 | - | - | 30 kwh | 5 V·100 V | - | - | ··· |
| AX120260 | FOOD | GASOLINE 70 L | - | 5 V LOCKER TYPE | RIGHT AND LEFT DOORS | 50 W × 2 | ··· |
| : | : | : | : | : | : | : | |

FIG. 4

| EMERGENCY SITUATION TYPE | RESPONSE INFORMATION | | | |
|---|---|---|---|---|
| | WORK | PLACE | EQUIPMENT | ··· |
| TSUNAMI | EVACUATION RECOMMENDATION | 3 m OR LESS (···, ···) MORE THAN 3 m (···, ···) | SPEAKER | ··· |
| | EVACUATION GUIDANCE | (35.···, 139···) | DISPLAY DEVICE | ··· |
| | ELECTRIC POWER SUPPLY | (35.···, 139···) | ELECTRIC POWER SUPPLY EQUIPMENT | ··· |
| | : | : | : | |
| FLOODING | : | : | : | |
| TRAFFIC SIGNAL FAILURE | : | : | : | |
| : | : | : | : | |

PROCESSING DEVICE, PROCESSING METHOD, AND PROCESSING PROGRAM

INCORPORATION BY REFERENCE

The disclosure of Japanese Patent Application No. 2019-034730 filed on Feb. 27, 2019 including the specification, drawings and abstract is incorporated herein by reference in its entirety.

BACKGROUND

1. Technical Field

The present disclosure relates to a processing device, a processing method, and a processing program.

2. Description of Related Art

In recent years, a vehicle that is made to autonomously travel, called an autonomous driving vehicle, has been suggested. In the autonomous driving vehicle, for example, a technique is known in which, in a case where information to the effect that a major earthquake occurs is received, an edge of a road having a space where the vehicle can be stopped is detected, and control is performed such that the vehicle is stopped at the detected road shoulder (Japanese Unexamined Patent Application Publication No. 2010-020371 (JP 2010-020371 A)).

SUMMARY

Although each autonomous driving vehicle can independently perform control for safely stopping the vehicle in a case where disaster occurs, in control for operating a plurality of autonomous driving vehicles in cooperation, a device that controls the autonomous driving vehicles is needed. For example, a management server transmits a control signal for cooperative operation to each autonomous driving vehicle, and each autonomous driving vehicle performs operation in response to the control signal, whereby the cooperative operation can be performed.

However, in a case where major disaster occurs, a communication network may be disconnected, and in a configuration in which a specific device (management server) transmits a control signal, there is a problem in that an autonomous driving vehicle that cannot perform communication with the management server due to failure of the communication network may not perform the cooperative operation.

The embodiments has been accomplished in view of the above-described problem, and an object is to provide a technique for operating a plurality of vehicles in cooperation in emergency.

A first aspect of the disclosure relates to a processing device that is mounted in a vehicle and is able to perform communication with a center server during a normal time. The processing device includes a controller. The controller is configured to execute searching for one or a plurality of other vehicles with which a host vehicle is able to perform communication, in emergency where a situation of emergency occurs and communication with the center server is disrupted, inquiring the other vehicles searched by the search about whether or not to enable intervention control related to the situation, and deciding a center vehicle giving an instruction related to the intervention control from among the other vehicles replying to enable the intervention control and the host vehicle.

A second aspect of the disclosure relates to a processing method in which a computer, which is mounted in a vehicle and is able to perform communication with a center server during a normal time. The processing method executes a step of searching for one or a plurality of other vehicles with which a host vehicle is able to perform communication, a step of, in emergency where a situation of emergency occurs and communication with the center server is disrupted, inquiring the other vehicles searched by the search about whether or not to enable intervention control related to the situation, and a step of deciding a center vehicle giving an instruction related to the intervention control from among the other vehicles replying to enable the intervention control and the host vehicle.

A third aspect of the disclosure relates to a program causing a computer to execute the above-described processing method or a computer-readable storage medium storing the program in a non-transitory manner.

According to the aspects of the disclosure, it is possible to provide a technique for operating a plurality of vehicles in cooperation in emergency.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 1 is a configuration diagram of an emergency response system and the like according to a first embodiment;

FIG. 2 is a diagram showing an example where positional information of each vehicle is stored in a position data table stored in the storage unit;

FIG. 3 is a diagram showing an example where resource information is stored in a data table stored in the storage unit;

FIG. 4 is a diagram showing an example where response information is stored in a data table stored in the storage unit;

DETAILED DESCRIPTION OF EMBODIMENTS

Figure 5:
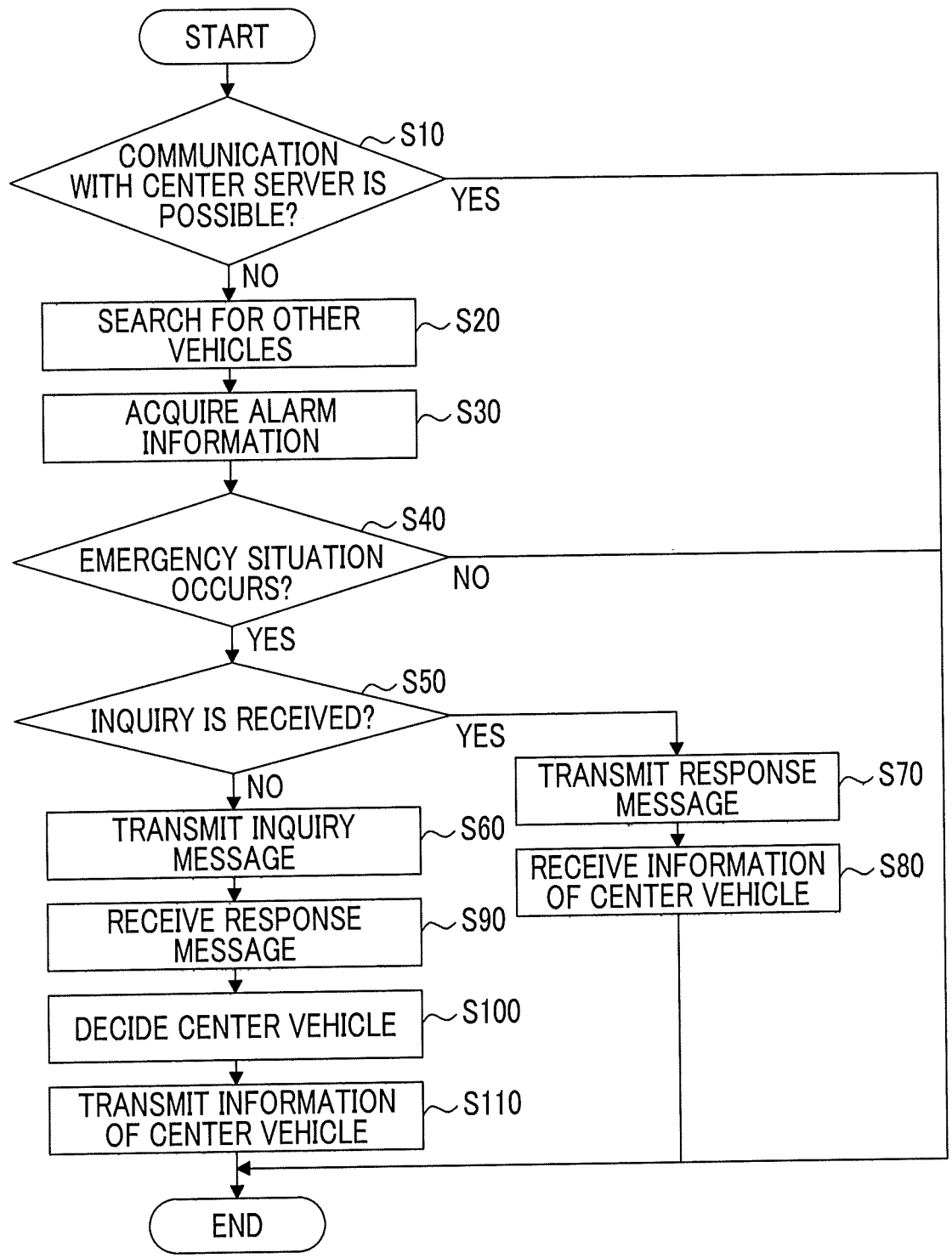
FIG. 5 is a diagram showing processing for deciding a center vehicle.

Autonomous driving vehicles that provide various services, for example, an autonomous driving vehicle for passenger transportation, such as a bus or a taxi, an autonomous driving vehicle for distribution, such as a truck or a courier, an autonomous driving vehicle for public relations, such as an advertising vehicle, and the like are known. In a case where the autonomous driving vehicles are widespread and present throughout the streets, in a situation of emergency (hereinafter, simply referred to as an emergency situation), such as an incident, an accident, or disaster, it is possible to give an instruction to an autonomous driving vehicle close to a scene and to make the autonomous driving vehicle respond to the emergency situation.

In this case, a center server performs communication with each autonomous driving vehicle during a normal time to ascertain a position of each autonomous driving vehicle, selects an autonomous driving vehicle near a scene in emergency, and gives an instruction to the selected autonomous driving vehicle; however, in a case where major disaster occurs, failure of a communication network or congestion of communication occurs, and an instruction may not be sent from the center server to the autonomous driving vehicle near the scene.

Accordingly, an emergency response system of an embodiment searches for other vehicles with which an in-vehicle device mounted in each autonomous driving vehicle can perform communication, and in emergency where a situation of emergency occurs and communication with the center server is disrupted, decides a center vehicle giving an instruction from among other vehicles enabling intervention control related to the emergency situation and a host vehicle. Then, the center vehicle gives an instruction relating to the intervention control to other vehicles to respond to the emergency situation.

In this way, the center vehicle is decided among the vehicles that can perform communication with one another, and the center vehicle gives an instruction to lead other vehicles, whereby it is possible to make each autonomous driving vehicle respond to the emergency situation even though communication with the center server is disrupted.

The emergency situation is, for example, a situation causing severe damage including a human-made accident, such as terrorism or a riot, disaster, such as an earthquake, tsunami, typhoon, or lightning, an automobile accident, a train accident, fire, blackout, or a flood, and needs an emergent response. Here, the term "emergent response" refers to, for example, a response as soon as possible. The emergent response is not limited to a response in a short time, and also includes a response over a necessary and sufficient period, such as a response over several days to several weeks according to the scale of a situation. In the embodiment, a period from the occurrence of the situation to the completion of the response is referred to emergency, and the other period is referred to as normal time.

A case where communication with the center server is disrupted is not limited to, for example, a case where the communication network fails, and includes a case where communication between the center server and each vehicle cannot be normally performed, such as a case where the center server fails, a case where a load of the center server increases and a resource needed for communication cannot be secured, a case where the communication network is congested and an unallowable delay occurs.

System Configuration

FIG. 1 is a configuration diagram of an emergency response system 100 and the like of the embodiment. The emergency response system 100 has a center server 1 and a plurality of vehicles 2. The center server 1 and each vehicle 2 can perform communication through a communication network N, such as the Internet. The communication network N includes a wireless circuit to which at least each vehicle 2 can be connected in a wireless manner. Each vehicle 2 is an autonomous driving vehicle that can autonomously travel based on instruction information indicating an instruction from the center server 1.

Each vehicle 2 can perform direct communication. In the embodiment, although a system of direct communication is not particularly limited, for example, a system in which communication is performed through WiFi, Bluetooth (Registered Trademark), business-use radio (simplicity radio), or the like may be employed. Each vehicle 2 may have a multihop function of being connected to other vehicles in a peer-to-peer manner through direct communication with other vehicles, in addition to direct communication with other vehicles within a reachable range of an electric wave emitted from the host vehicle, thereby constituting an ad hoc network.

In addition, each vehicle 2 acquires notification information indicating an emergency situation from a notification server 3. In the embodiment, although an example of a tsunami is primarily described, the disclosure is not limited thereto, and it is possible to enable a response to a variety of emergency situations, such as disaster and an automobile accident, from a plurality of notification servers 3. In this case, each vehicle 2 can perform communication with servers that notify of information of other emergency situations, such as a server that issues an alarm related to weather or a server that gives information of an automobile accident, and receives the notification.

The center server 1 is a computer that performs communication with each vehicle 2 through the communication network N and manages each vehicle 2. In FIG. 1, although the center server 1 is shown like a single computer device, the disclosure is not limited thereto, and the center server 1 may be implemented by a plurality of computer devices. The center server 1 includes a processing unit 11, a storage unit 12, a display unit 13, an input unit 14, and a communication unit 15.

The processing unit 11 controls the overall operation of the center server 1 and implements various functions of the center server 1. The processing unit 11 includes, for example, a central processing unit (CPU), a read only memory (ROM), and a random access memory (RAM). The CPU integrally controls the operation of the center server 1. The ROM is a storage medium that stores various programs or data. The RAM is a storage medium that temporarily stores various programs or rewrites various kinds of data.

The CPU executes a program stored in the ROM, the storage unit 12, or the like with the RAM as a work area. The processing unit 11 executes the program, thereby including a request receiver 111, an alarm acquisition unit 112, an instruction generation unit 113, a communication controller 114, and a display controller 115.

The request receiver 111 receives a request to the vehicle 2, such as transportation of articles or transportation of passengers. For example, in a case where a user designates a boarding place and an unboarding place from a terminal, such as a smartphone, and transmits a boarding request to the center server 1, the request receiver 111 receives the request.

The alarm acquisition unit 112 acquires alarm information indicating the occurrence of an emergency situation from another server, such as the notification server 3.

The instruction generation unit 113 generates instruction information indicating an operation to be performed by the vehicle 2 based on the request received by the request receiver 111 or the alarm information acquired by the alarm acquisition unit. For example, in a case where the boarding request is received by the request receiver 111, the instruction generation unit 113 specifies a vehicle closest to the boarding place among the vehicles 2, which perform passenger transportation, makes the vehicle move to the boarding place and take the user (passenger) as a request source on board, and generates the instruction information indicating transportation to the unboarding place. In a case where the alarm information is acquired by the alarm acquisition unit 112, the instruction generation unit 113 generates the instruction information for instructing a work to be executed by each vehicle, such as evacuation guidance, transportation of goods, or supply of electric power, based on response information regarding a response decided according to the type of an alarm. In this case, a vehicle suitable for a work to be executed may be selected based on resource information indicating a resource in each vehicle. For example, in a case where the alarm information indicating the occurrence of a tsunami is acquired, the instruction generation unit 113 specifies to perform the evacuation guidance based on the response information, specifies the vehicle 2 equipped with an external display or an external speaker for use in the evacuation guidance, and generates the instruction information indicating the evacuation guidance addressed to the vehicle 2.

The communication controller 114 is connected to the vehicle 2 through the communication network N and transmits the instruction information generated by the instruction generation unit 113 to the vehicle 2.

The storage unit 12 is a storage device, such as a hard disk drive (HDD) or a solid state drive (SSD). The storage unit 12 stores positional information, resource information, response information, and the like of each vehicle.

The display unit 13 is a unit that displays information, and is, for example, a liquid crystal display (LCD), an organic electro-luminescence (EL) display, or the like. The input unit 14 is a unit that receives an operator's operation, and is, for example, a keyboard, a mouse, or the like. The resource information, the response information, or the like is input through the input unit 14. The input unit 14 may be a unit that receives an input of the resource information or the response information from other devices. The communication unit 15 is a communication interface that is provided to perform communication with an external device.

Next, the vehicle 2 will be described. The vehicle 2 has a vehicle control device 21, a drive unit 22, a battery 23, a sensor 24, and a camera 25.

The drive unit 22 is a mechanism that makes the vehicle 2 travel, and has a power source, such as an internal combustion engine or a motor, an electric power generator, a braking mechanism, a steering mechanism, and the like.

The battery 23 supplies electric power to the units of the vehicle 2, such as the vehicle control device 21. As the battery 23, various batteries, such as a battery that stores electric power generated by the electric power generator of the drive unit 22, a battery that stores electric power in being connected to an external commercial electric power supply, and a fuel cell that generates electric power using fuel, such as hydrogen, may be employed.

The sensor 24 includes a vehicle speed sensor, an acceleration sensor, a direction sensor, a rainfall sensor, a temperature sensor, an obstacle sensor, and the like, and detects a status of the host vehicle or a surrounding status. The obstacle sensor may be a camera, a radar, laser imaging detection and ranging (LiDAR), or the like.

The camera 25 is a unit that images the surroundings of the host vehicle. For example, a plurality of cameras 25 may be provided, and captures images forward, rearward, rightward, leftward, and the like of the vehicle. An image captured by the camera 25 may be a moving image or a still image. In the embodiment, the camera 25 may be used as a sensor that acquires information indicating surrounding circumstances.

The vehicle control device 21 is a computer that is mounted in the vehicle 2, and includes a processing unit 201, a storage unit 202, a display unit 203, an input unit 204, a communication unit 205, and a speaker 206. The vehicle control device 21 in the embodiment is a form of a processing device.

The processing unit 201 controls the overall operation of the vehicle control device 21 and implements various functions of the vehicle control device 21. The processing unit 201 is a form of a processing unit in the embodiment. The processing unit 201 includes, for example, a CPU, a ROM, and a RAM. The CPU integrally controls the operation of the vehicle control device 21. The ROM is a storage medium that stores various programs or data. The RAM is a storage medium that temporarily stores various programs or data. The RAM may be accessed directly from the CPU and may function as a main memory. The CPU executes a program stored in the ROM, the storage unit 202, or the like with the RAM as a work area. The processing unit 201 executes the program (hereinafter, referred to as an emergency response program), thereby including a search unit 211, an inquiry unit 212, a decision unit 213, an instruction generation unit 214, a driving controller 215, a communication controller 216, and an output controller 217.

The search unit 211 searches for one or a plurality of other vehicles 2 with which the host vehicle 2 can perform communication. For example, the search unit 211 searches for other vehicles 2 connectable to the host vehicle 2 in a peer-to-peer manner as other communicable vehicles 2 through direct communication between the host vehicle 2 and other vehicles 2 and direct communication between other vehicles. In the search, the search unit 211 may acquire the resource information or the positional information from other communicable vehicles 2 and may store the resource information or the positional information in the storage unit.

FIG. 2 is a diagram showing an example where the positional information of each vehicle is stored in a position data table stored in the storage unit. In FIG. 2, the positional information indicating a current position of each vehicle is stored for each vehicle ID as identification information of each vehicle 2. As the positional information, for example, position coordinates (latitude and longitude) in the world geodetic system are exemplified; however, the disclosure is not limited thereto, and coordinates set uniquely, a link number of a road on which each vehicle is traveling, an area mesh code of an area where each vehicle is present, or the like may be employed.

FIG. 3 is a diagram showing an example where the resource information is stored in a data table stored in the storage unit. In FIG. 3, the resource information indicating a resource of each vehicle is stored for each vehicle ID. The resource information is, for example, information relating to a load, fuel, a battery, electric power supply equipment, an external display device, an external speaker, a communication unit, or the like. Information of the load relates to a package loaded on the vehicle and indicates the type or the amount of a load to be providable as relief goods, such as water or food. Information of fuel relates to the type or the amount of fuel of the vehicle 2 and indicates a travelable distance or an operable time of the vehicle 2. Information of the battery indicates the remaining capacity of the battery of the vehicle 2, and in a case where the vehicle 2 is an electric vehicle, indicates a travelable distance or an operable time. Information of the electric power supply equipment indicates the type or the amount of electric power to be supplied, such as direct current 5 V or alternating current 100 V. The electric power supply equipment, the external display device, and the external speaker are an example of equipment that is mounted in the vehicle 2. Information of the electric power supply equipment may indicate the system of the electric power generation equipment, such as a solar cell, a fuel cell, or a gasoline type electric power generator. Information of the external display device indicates the number of display devices that performs display toward the surroundings of the host vehicle 2 or the size of a display region. Information of the external speaker indicates the presence or absence, or an output value of a speaker that outputs sound, such as alarm sound or a voice message, toward the surroundings of the host vehicle 2. Information of the communication unit indicates a communication system of a communication unit in the host vehicle or the number of other communicable vehicles.

The inquiry unit 212 inquires other vehicles 2 searched by the search about whether or not to enable intervention control related to the emergency situation in emergency where an emergency situation occurs and communication with the center server 1 is disrupted.

The decision unit 213 decides the center vehicle giving an instruction related to the intervention control from among the other vehicles replying to enable the intervention control and the host vehicle. For example, the decision unit 213 decides, as the center vehicle, the vehicle 2 having equipment for responding to the emergency situation or the vehicle 2 capable of securing an operation time for a response based on the resource information or the positional information of the host vehicle 2 and other vehicles 2.

The instruction generation unit 214 generates the instruction information indicating an operation to be performed by other vehicles 2 based on the alarm information acquired from the notification server 3. For example, the instruction generation unit 214 specifies a work to be executed by each vehicle 2 based on the response information regarding a response decided according to the type of an alarm indicated by the alarm information and generates the instruction information for instructing the work. The work to be executed is, for example, at least one of route guidance, traffic control, movement of vehicles, transportation of goods, and supply of electric power. In this case, the vehicle 2 suitable for the work to be executed may be selected based on the resource information of each vehicle 2. For example, in a case where the alarm information indicating the occurrence of a tsunami is acquired, the instruction generation unit 113 specifies to perform the evacuation guidance based on the response information, specifies the vehicle 2 equipped with an external display or an external speaker for use in the evacuation guidance, and generates the instruction information indicating the evacuation guidance addressed to the vehicle 2. FIG. 4 is a diagram showing an example where the response information is stored in a data table stored in the storage unit. In FIG. 4, a work to be executed, a place of the work, and equipment needed for the work are stored for each type of alarm. As information indicating a place where a work is executed, for example, position coordinates (latitude and longitude) in a world geodetic system are exemplified; however, the disclosure is not limited thereto, coordinates set uniquely, a link number of a road on which each vehicle travels, a node number of an intersection, an area mesh code of an area where each vehicle executes a work, or the like may be employed.

For example, in a case where the alarm information indicating the occurrence of a tsunami is acquired, the instruction generation unit 214 specifies the vehicle 2 equipped with an external display or an external speaker and generates the instruction information for instructing traveling along a route circulating an area where evacuation is needed while outputting a voice message for prompting evacuation. The instruction information for instructing to make the vehicle 2 stop near an intersection and display information regarding an area where evacuation is needed, a direction of evacuation, and the like on the external display device to perform guidance of an evacuation route is generated.

The driving controller 215 performs control such that the host vehicle autonomously travels toward a destination. For example, in a case where the instruction information is acquired from the center server 1 or the center vehicle 2, the driving controller 215 performs autonomous driving along the route instructed by the instruction information.

The communication controller 216 controls communication with an external device through the communication unit 205. For example, the communication controller 216 is connected to the center server 1 or the notification server 3 through the communication network N and acquires the instruction information or the alarm information. The communication controller 216 performs direct communication with other vehicles. In a case where the host vehicle is the center vehicle, the communication controller 216 transmits the instruction information generated by the instruction generation unit 214 to other vehicles 2. In a case where the host vehicle is not a center vehicle, the communication controller 216 receives the instruction information from the center vehicle.

The output controller 217 performs control such that various kinds of information are displayed and output on the display unit 203 or sound information is output from the speaker 206.

The storage unit 202 is a storage device, such as an HDD or an SSD. The storage unit 202 functions as an external storage device of the processing unit 201. The storage unit 202 stores map information, the response information, the resource information, and the like. The display unit 203 is a unit that displays information, and is, for example, a liquid crystal display, an organic EL display, or the like. The display unit 203 is provided inside the vehicle, and may be a display device that performs display for an occupant or a passenger inside the vehicle or may be external display device that performs display for a person outside the vehicle.

The input unit 204 is a unit that receives a user's operation, and is, for example, buttons, a touch panel, or the like. The communication unit 205 is a communication interface that is provided to perform communication with an external device. The communication unit 205 may include a plurality of communication interfaces including a communication interface that is provided to perform direct communication with other vehicles, in addition to a communication interface that is provided to perform communication through the communication network N. As the communication interface that is provided to perform direct communication with other vehicles, a communication interface that is provided to perform communication using an ad hoc mode, such as Bluetooth, ZigBee (Registered Trademark), or WiFi, is exemplified. A communication interface that is provided to perform communication using business-use radio (simplicity radio) may be employed.

The notification server 3 is a computer that transmits the alarm information to the notification server 3 or each vehicle 2 through the communication network N. The notification server 3 includes a processing unit 31, a storage unit 32, a display unit 33, an input unit 34, and a communication unit 35.

The processing unit 31 controls the overall operation of the notification server 3 and implements various functions of the notification server 3. The processing unit 31 includes, for example, a CPU, a ROM, and a RAM. The CPU integrally controls the operation of the notification server 3. The ROM is a storage medium that stores various programs or data. The RAM is a storage medium that temporarily stores various programs or rewrites various kinds of data. The CPU executes a program stored in the ROM, the storage unit 32, or the like with the RAM as a work area. The processing unit 31 executes the program, thereby including an alarm determination unit 311 and an alarm transmission unit 312.

The alarm determination unit 311 determines whether or not an emergency situation in which an alarm should be issued occurs based on an input from the sensors or the like. For example, the intensity (earthquake intensity) of a shake (earthquake) is measured by a seismograph (sensor) installed in each area, and determination is made that an earthquake occurs in a case where a shake of a predetermined intensity or more occurs. In a case where determination is made that the earthquake occurs, the alarm determination unit 311 refers to a database in which the magnitude or place of an occurring tsunami is stored according to the position or intensity of the earthquake, obtains the height of the occurring tsunami according to a detection result of the seismograph, determines that a tsunami needing an alarm occurs in a case where the height is equal to or higher than a threshold value, and specifies the place. The determination of the emergency situation is not limited to an earthquake or a tsunami, and may be determination of a flood according to a water level of a river, determination of landslide disaster according to the amount of rainfall, or the like. The alarm transmission unit 312 transmits the alarm information indicating the occurrence of the emergency situation determined by the alarm determination unit 311 to the center server 1 or the vehicles 2.

The storage unit 32 is a storage device, such as a hard disk drive (HDD) or a solid state drive (SSD). The display unit 33 is a unit that displays information, and is, for example, a liquid crystal display (LCD), an organic electro-electroluminescence (EL) display, or the like. The input unit 34 is a unit that receives an operator's operation, and is, for example, a keyboard, a mouse, or the like. The resource information, the response information, or the like are input through the input unit 34. The input unit 34 may be a unit that receives an input of the resource information or the response information from other devices. The communication unit 35 is a communication interface that is provided to perform communication with an external device.

Processing Method

Figure 6:
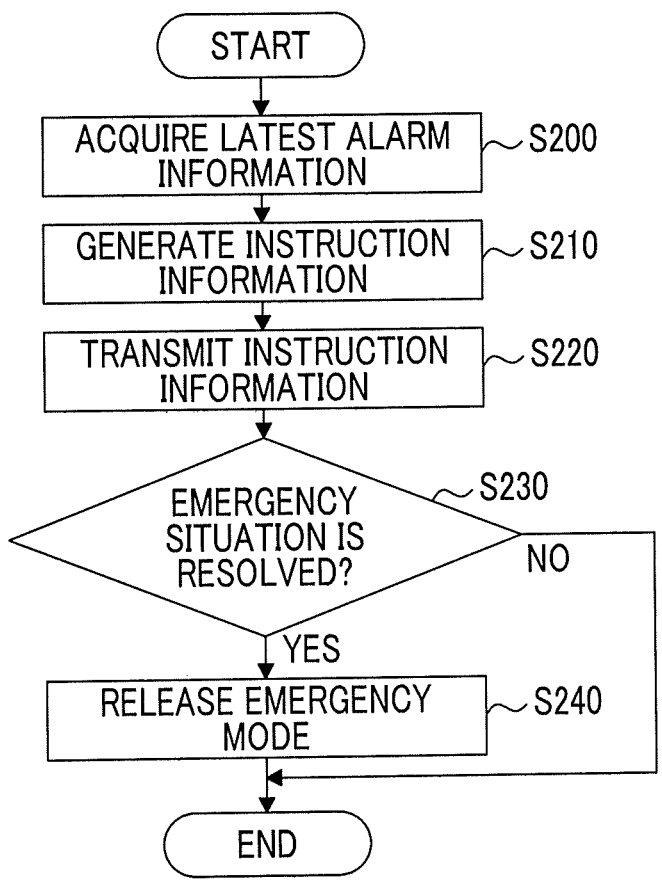
FIG. 6 is a diagram showing processing in which the center vehicle transmits instruction information to other vehicles.
Figure 7:
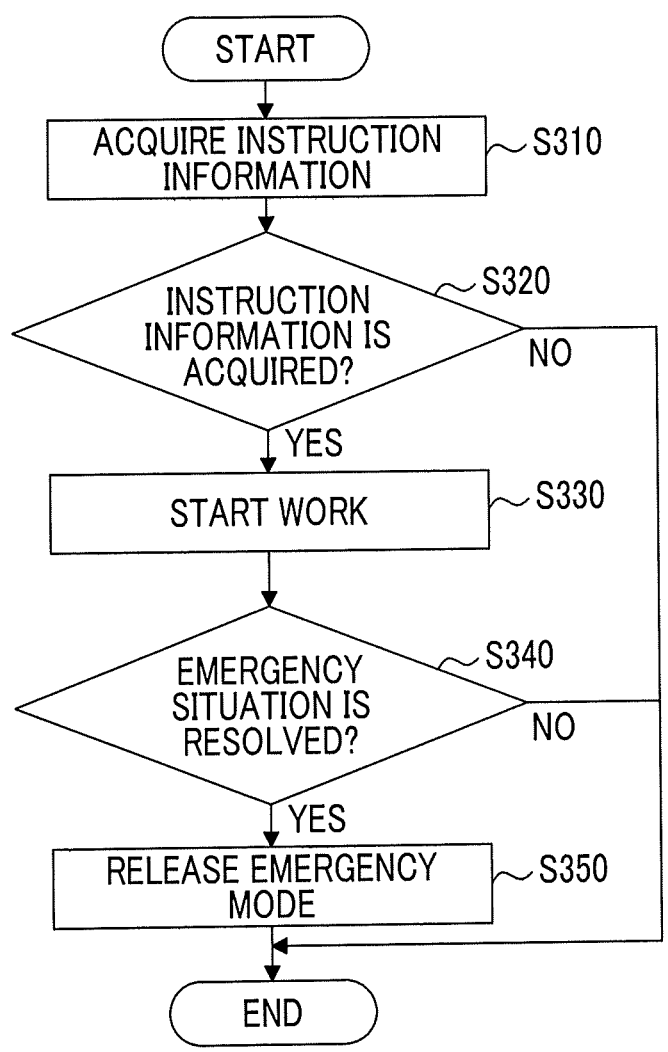
FIG. 7 is a diagram showing processing in which a vehicle control device receives instruction information from the center vehicle and executes a work.

Next, processing that is executed by the vehicle control device 21 in emergency will be described. FIGS. 5 to 7 are flowcharts showing processing that is executed by the vehicle control device 21 of each vehicle 2. FIG. 5 is a diagram showing processing for deciding a center vehicle, FIG. 6 is a diagram showing processing in which the center vehicle 2 transmits the instruction information to other vehicles 2, and FIG. 7 is a diagram showing processing for receiving an instruction from the center vehicle and executing a work. The vehicle control device 21 executes the processing of FIG. 5 in a case where electric power is supplied. The processing of FIG. 5 is repeatedly executed until electric power is cut off or an instruction to stop is received.

In Step S10, the vehicle control device 21 determines whether or not communication with the center server 1 is possible. The vehicle control device 21 ends the processing of FIG. 5 in a case where affirmative determination is made in Step S10, and progresses to Step S20 in a case where negative determination is made in Step S10.

In Step S20, the vehicle control device 21 searches for other communicable vehicles 2. In the embodiment, the vehicle control device 21 searches for other vehicles 2 connectable to the host vehicle 2 in a peer-to-peer manner as other communicable vehicles 2 through direct communication between the host vehicle 2 and other vehicles 2 and direct communication between other vehicles. In the example, although other vehicles 2 are searched in a case where communication with the center server 1 is disrupted in the processing shown in FIG. 5, the disclosure is not limited thereto, and other vehicles 2 may be searched at regular intervals separately from the processing of FIG. 5, and a search result may be read in Step S20.

In Step S30, the vehicle control device 21 acquires the alarm information from the notification server 3. For example, the vehicle control device 21 is connected to the notification server 3, requests the alarm information, and receives the alarm information transmitted from the notification server 3. In a case where the notification server 3 broadcasts the alarm information, the vehicle control device 21 may receive the alarm information at any time, may store the alarm information in a memory, and may read the alarm information from the memory in Step S30 to acquire the alarm information.

In Step S40, the vehicle control device 21 determines whether or not the alarm information indicating the occurrence of the emergency situation is acquired in Step S30. In a case where the emergency situation does not occur, and the alarm information cannot be acquired from the notification server 3 in Step S30 or in a case where information indicating that the emergency situation does not occur is acquired, the vehicle control device 21 makes negative determination and ends the processing of FIG. 5. In a case where the emergency situation occurs, and the alarm information is acquired from the notification server 3 in Step S30, the vehicle control device 21 makes affirmative determination in Step S40, stores, in the memory, information to the effect that an emergency mode is set, and progresses to Step S50.

In Step S50, the vehicle control device 21 determines whether or not an inquiry message for inquiring whether or not to enable the intervention control related to the emergency situation is received from other vehicles 2. In a case where negative determination is made in Step S50, the vehicle control device 21 transmits the inquiry message to other vehicles 2 searched in Step S20 (Step S60), and in a case where affirmative determination is made in Step S50, the vehicle control device 21 progresses to Step S70. That is, determination is made that the inquiry message is not received in Step S50, the vehicle control device 21 that initially transmits the inquiry message among the vehicles 2 executes processing of Steps S90 to S110, and the vehicle control device 21 that receives the inquiry message from other vehicles 2 executes processing of Steps S70 and S80.

In a case where affirmative determination is made in Step S50, the vehicle control device 21 transmits a response message indicating whether or not the host vehicle enables the intervention control to the vehicle 2 as an inquiry source (Step S70). In regard to the response message, for example, "enable" or "disable" is set in advance by a manager of the vehicle 2, and the set response message is transmitted. For the vehicle 2 that takes a passenger on board, in a case where a passenger is on board, "disable" may be set. In a case where a passenger is not on board, the vehicle 2 may be made to follow setting. The vehicle control device 21 may respond whether or not to enable the intervention control according to the type of the emergency situation, such as "enable" for an earthquake and a tsunami or "disable" for an automobile accident and an incident.

In Step S80, the vehicle control device 21 receives, from other vehicles 2, information indicating the center vehicle decided from among the vehicles 2 replying the acceptance of the intervention control and the vehicle 2 as an inquiry source.

On the other hand, the vehicle control device 21 that transmits the inquiry message in Step S60 receives a response message to the inquiry message from each vehicle 2 in Step S90.

In Step S100, the vehicle control device 21 decides a center vehicle from among the vehicles 2 enabling the intervention control and the host vehicle based on the response message received in Step S90. For example, the decision unit 213 sets the vehicle, the resource information or the positional information of which satisfies a predetermined condition, from among the host vehicle 2 and other vehicles 2 as the center vehicle 2. Here, as the predetermined condition, a condition that specific equipment for responding to the emergency situation is provided, a condition that the amount of fuel or the battery remaining capacity is the largest, a condition that the number of vehicles capable of direct communication is the largest, a condition that the distance to a specific position is the shortest, or the like is exemplified. The predetermined condition may be changed according to the type of the emergency situation. For example, in a case where the type of the emergency situation is a tsunami, an external display device and an external speaker are set as the specific equipment, in a case where the type of the emergency situation is blackout, electric power supply equipment is set as the specific equipment, and a condition for the center vehicle is that the vehicle includes the specific equipment. In a case where the center vehicle does not execute a work, such as an output of a voice message or display for evacuation guidance, and performs cooperative control, such as transmission of instruction information, a condition for the center vehicle may be that the vehicle does not include the specific equipment. In a case where the vehicles 2 for a work are arranged in an evacuation zone and at a place for evacuation guidance, a position to be the center of the vehicles 2, that is, a position easy to perform communication with each vehicle 2 is set as a specific position, and a condition for the center vehicle may be that the vehicle is at the position closest to the specific position. A position of a place of evacuation may be set as the specific position such that the center vehicle does not suffer from disaster. In a case where a plurality of vehicles satisfies the conditions, the center vehicle may be specified according to predetermined priority, such as the vehicle having the smallest identification number.

In Step S110, the vehicle control device 21 transmits information indicating the center vehicle 2 decided in Step S90 to each vehicle 2.

The vehicle control device 21 that receives information indicating the center vehicle 2 stops the processing of FIG. 5 and executes the processing of FIG. 6 or 7. The vehicle control device 21 repeatedly executes the processing of FIG. 6 or 7 until the emergency mode is released.

The vehicle control device 21 that is decided as the center vehicle starts the processing of FIG. 6 and acquires the latest alarm information from the notification server 3 (Step S200). The alarm information may be information indicating that a situation of emergency does not occur or a situation of emergency ends, other than information indicating that a situation of emergency occurs.

In Step S210, the vehicle control device 21 generates the instruction information indicating an operation to be performed by other vehicles 2 based on the acquired alarm information. For example, the instruction generation unit 214 of the vehicle control device 21 specifies a work to be executed by each vehicle 2 based on the response information regarding a response decided according to the type of an alarm indicated by the alarm information and generates the instruction information for instructing the work. In a case where the type of the alarm information is the occurrence of a tsunami, the instruction generation unit 214 reads an evacuation zone according to the height of the tsunami from the place of the work of the response information and reads information indicating an evacuation place or a voice message for prompting evacuation. Then, the instruction generation unit 214 divides the evacuation zone according to the number of vehicles 2 replying to accept the intervention control and obtains a route for patrolling each divided zone to generate the instruction information including the route and the voice message for prompting evacuation to the evacuation place. In repeating the processing of FIG. 6, in a case where the instruction information is already generated based on the alarm information acquired in Step S200, the vehicle control device 21 may omit the generation of the instruction information in Step S210, and in a case where the alarm information acquired in Step S200 is updated, may generate the instruction information based on the updated alarm information. For example, in a case where the predicted height of the tsunami is changed, the evacuation zone is reset according to the height of the tsunami after change, and the instruction information is updated based on the reset evacuation zone. The instruction information for instructing the vehicle 2 including the electric power generation equipment to set the place of evacuation as a destination and to perform supply of electric power may be created.

In Step S220, the vehicle control device 21 transmits the instruction information generated in Step S210 to each vehicle 2.

In Step S230, the vehicle control device 21 determines whether or not the emergency situation is resolved. For example, in a case where the alarm information indicating that the situation of emergency ends is acquired from the notification server 3 or in a case where a predetermined time has elapsed from a time when the occurrence of the tsunami is predicted, and in a case where communication with the center server 1 becomes possible, affirmative determination is made, and the vehicle control device 21 progresses to Step S240. Otherwise, negative determination is made, and the vehicle control device 21 ends the processing of FIG. 6.

In a case where the affirmative determination is made in Step S230, the vehicle control device 21 transmits information indicating the resolution of the emergency situation to other vehicles 2 and deletes information regarding the emergency mode from the memory to release the emergency mode.

The vehicle control device 21 of the vehicle 2 that does not become the center vehicle starts the processing of FIG. 7, and in Step S310, acquires the instruction information from the center vehicle 2.

In Step S320, the vehicle control device 21 determines whether or not new instruction information is acquired in Step S310. In a case where negative determination is made in Step S320, the vehicle control device 21 ends the processing of FIG. 7.

In a case where affirmative determination is made in Step S320, the vehicle control device 21 progresses to Step S330 and starts a work based on the instruction information. For example, the vehicle control device 21 starts a work, such as autonomous traveling along the route included in the instruction information or an output of the voice message from the external speaker as sound. The vehicle control device 21 executes the work started in Step S330 in parallel with the processing of FIG. 7. That is, the vehicle control device 21 progresses to Step S340 after starting the work in Step S330 without waiting for the end of the work, and determines whether or not information indicating the resolution of the emergency situation is received from the center vehicle 2.

In a case where affirmative determination is made in Step S330, the vehicle control device 21 progresses to Step S340, ends the work started in Step S320, and in Step S350, deletes information regarding the emergency mode from the memory to release the emergency mode.

On the other hand, in a case where negative determination is made in Step S340, the vehicle control device 21 ends the processing of FIG. 7 and repeatedly executes the processing of FIG. 7 until affirmative determination is made in Step S340.

Specific Example

Figure 8:
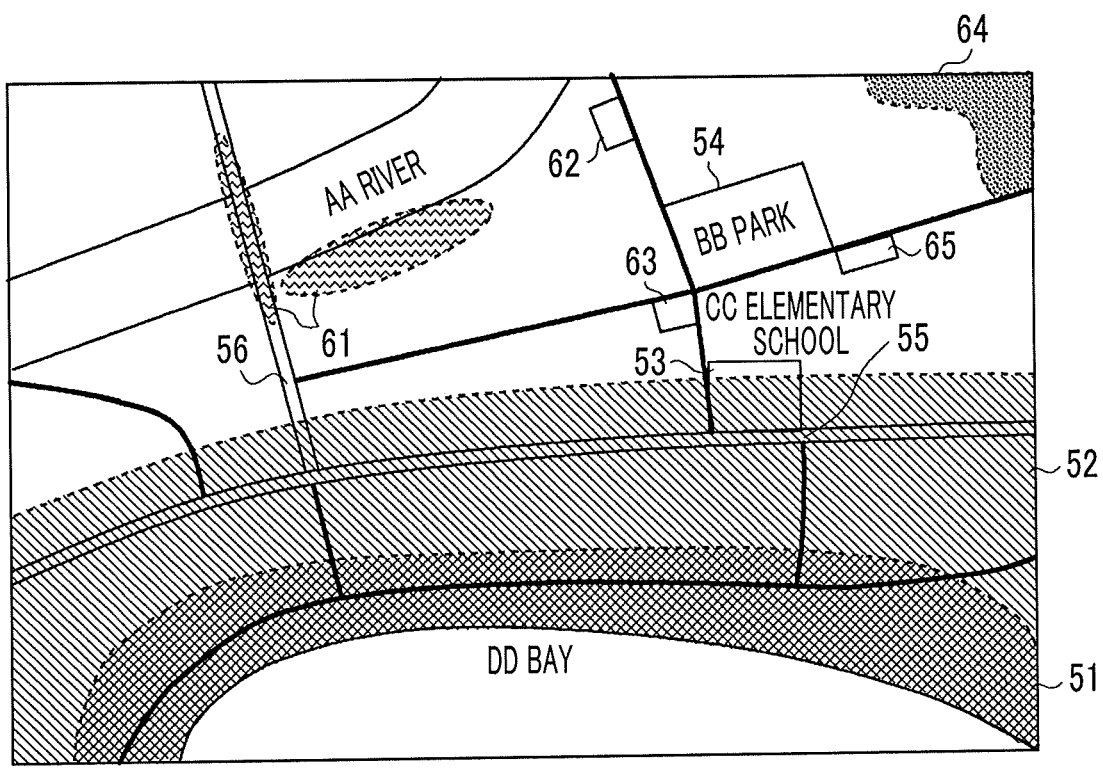
FIG. 8 is a diagram illustrating a specific example of a work that is executed in emergency.

FIG. 8 is a diagram illustrating a specific example of a work that is executed in emergency. In FIG. 8, area 51, 52 are evacuation zones in a case where the occurrence of a tsunami is predicted. In a case where the alarm information indicates that the height of the tsunami is "high" or 3 m or less, the area 51 is specified as the evacuation zone based on the response information. In a case where the alarm information indicates that the height of the tsunami is "huge" or a value more than 3 m, the area 52 is specified as the evacuation zone based on the response information. In FIG. 8, a CC elementary school 53 and a BB park 54 are places of evacuation in a case where the occurrence of the tsunami is predicted, and intersections 55, 56 are places where evacuation guidance, such as display of maps to the places of evacuation, is performed. The CC elementary school 53 is the place of evacuation in a case where the height of the tsunami is "high" or 3 m or less, and the BB park 54 is a place of evacuation in a case where the height of the tsunami is "huge" or a value more than 3 m.

In FIG. 8, an area 61 is an evacuation zone in a case where flooding of a river is predicted, and shelters 62, 63 are places of evacuations in a case where flooding of a river is predicted. An area 64 is an evacuation zone in a case where landslide disaster is predicted, and a shelter 65 is a place of evacuation where landslide disaster is predicted.

In a case where the occurrence of a tsunami is predicted based on the detection result of the seismograph, the notification server 3 provides information indicating the occurrence of the tsunami, the predicted height of the tsunami, and alarm information including an arrival time to the vehicle 2. The vehicle control device 21 of the center vehicle 2 that acquires the alarm information specifies an evacuation zone corresponding to the alarm information, a place of evacuation, a place where evacuation guidance is performed, and a voice message for use in the evacuation guidance, and generates instruction information.

The voice message is set as, for example, "a tsunami of <height> is predicted to arrive at <time>. Urgent, please evacuate to <place of evacuation>". Here, <height>, <time>, and <place of evacuation> are arguments and are set according to the value indicated by the alarm information. For example, in a case where a height is 10 m and an arrival time is 14:10, a voice message "A tsunami of 10 m is expected to arrive at 14:10. Urgent, please evacuate to the BB park." is generated. The vehicle control device 21 specifies the evacuation zone and obtains a route for patrolling within the zone. In this case, the evacuation zone may be divided according to the number of patrolling vehicles 2, and the divided zone may be allocated to each vehicle.

The number of patrolling vehicles is, for example, the number of vehicles 2 including an external speaker other than the vehicle 2 performing the evacuation guidance among the vehicles 2 replying to enable the intervention control. In this case, in a case where the center vehicle also performs the patrol of the evacuation zone or the evacuation guidance, the number of patrolling vehicles is increased by one. That is, in a case where the number of vehicles 2 connectable in a peer-to-peer manner is ten, an inquiry about whether or not to enable the intervention control is made from the vehicle 2, seven vehicles among other nine vehicles 2 reply to enable the intervention control, the number of patrolling vehicles 2 is five excluding two vehicles that perform the evacuation guidance. In this case, the center vehicle 2 executes the processing of FIG. 6 without performing the patrol of the evacuation zone or the evacuation guidance, and transmits the instruction information to each vehicle 2. The center vehicle 2 may perform the patrol of the evacuation zone or the evacuation guidance, whereby the number of patrolling vehicles 2 may be six.

The vehicle control device 21 of the center vehicle 2 may generate instruction information for instructing the vehicle 2, which includes electric power supply equipment without including an external display device or an external speaker, to move to the place of evacuation and to perform supply of electric power. For example, the instruction information for instructing supply of electric power may be transmitted to the vehicle 2 including electric power generation equipment among the vehicles 2 that end the patrol of the evacuation zone.

Figure 9:
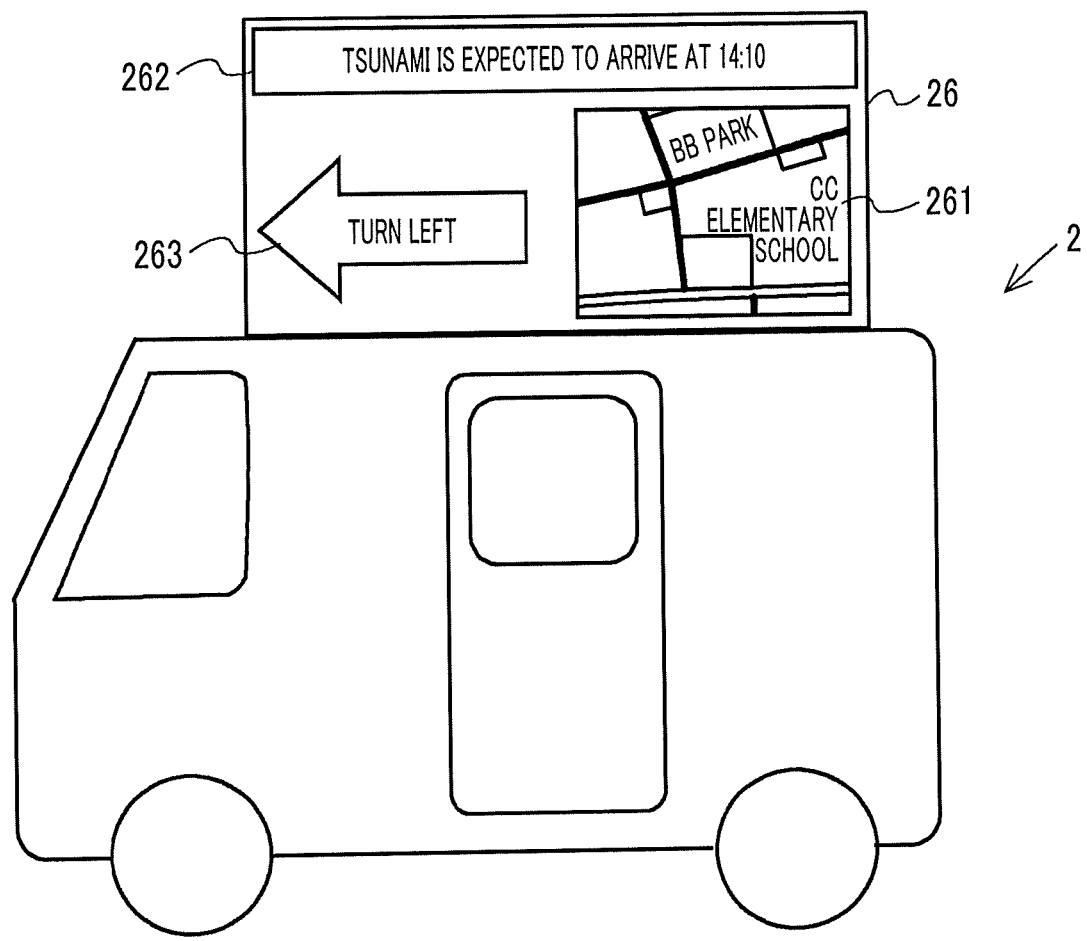
FIG. 9 is a diagram showing an example of a vehicle that performs evacuation guidance.

FIG. 9 is a diagram showing an example of the vehicle 2 that performs the evacuation guidance. As shown in FIG. 9, as the vehicle 2 that performs the evacuation guidance, the vehicle 2 including an external display device 26 is selected.

On the external display device 26, information regarding a map 261 from the place of the evacuation guidance to the place of evacuation, information 262 of the tsunami, an arrow 263 indicating a direction of evacuation, and the like are displayed. Even in the vehicle 2 that performs the evacuation guidance, the voice message may be output from an external speaker.

Figure 10:
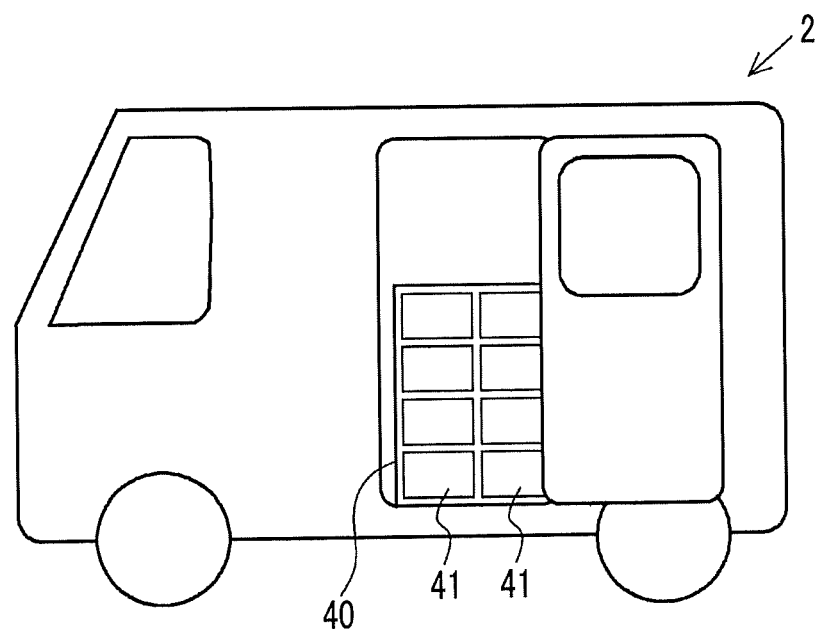
FIG. 10 is a diagram showing an example of a vehicle that performs supply of electric power.

FIG. 10 is a diagram showing an example of the vehicle 2 that performs the supply of electric power. As shown in FIG. 10, the vehicle 2 that performs the supply of electric power includes electric power supply equipment 40. The electric power supply equipment 40 is a locker including a plurality of housings 41 housing electronic equipment as a target of supply of electric power, and has an electric power supply cable for supplying electric power inside each housing 41. The user connects the electronic equipment, such as a mobile phone, to the electric power supply cable, puts the electronic equipment in the housing 41, and locks the housing 41. Then, the user unlocks the housing 41 at a time when charging is completed, and takes out the electronic equipment. With this, even though charging of electronic equipment needed in emergency has run out, the user receives electric power from the electric power supply equipment 40 to charge the electronic equipment and to make the electronic equipment available. The electric power supply equipment 40 is not limited to the locker, and may be an outlet that supplies the same electric power (in a case of Japan, 100 V, 50 Hz/60 Hz) as a commercial power supply.

The vehicle 2 that receives the instruction information for the supply of electric power autonomously travels while setting an electric power supply place (for example, a place of evacuation) indicated by the instruction information as a destination, in a case of arriving at the electric power supply place, opens a door of a load compartment including a locker as the electric power supply equipment 40 or a cover of an outlet, and performs the supply of electric power.

Effects of Embodiment

The vehicle control device 21 of the embodiment searches for other vehicles 2 with which the host vehicle 2 is able to perform communication, inquires other vehicles 2 searched by the search about whether or not to enable the intervention control in emergency where the situation of emergency occurs and communication with the center server 1 is disrupted, and decides the center vehicle giving the instruction related to the intervention control from among other vehicles 2 replying to enable the intervention control and the host vehicle 2. With this, even though communication with the center server 1 is disrupted, the center vehicle 2 transmits the instruction information to other vehicles 2, whereby it is possible to operate a plurality of vehicles 2 in a cooperative manner and make the vehicles 2 response to the emergency situation.

The vehicle control device 21 of the embodiment searches for the vehicles 2 connectable in a peer-to-peer manner through direct communication between the host vehicle 2 and other vehicles 2 and direct communication between other vehicles as other communicable vehicles 2. With this, even though a facility, such as an access point or a base station, constituting the communication network N is out of order at the time of large scale disaster, it is possible to transfer the instruction information with the communication unit in each vehicle, and to operate the vehicles 2 in a cooperative manner.

The vehicle control device 21 of the embodiment acquires the resource information indicating at least one of mounted equipment, a load, a remaining amount of fuel, a remaining capacity of the battery, and a communication circumstance for each of the host vehicle 2 and other vehicles 2, and decides the center vehicle based on the resource information. With this, it is possible to decide, as the center vehicle 2, the vehicle that has equipment needed for responding to the emergency situation, the vehicle that easily performs communication with each vehicle, or the vehicle that is appropriate as the vehicle 2 transmitting the instruction information.

The vehicle control device 21 of the embodiment transmits an instruction for instructing to perform route guidance, traffic control, movement, transportation of goods, and supply of electric power to other vehicles 2 in a case where the host vehicle 2 is the center vehicle 2. With this, it is possible to allow various works to be performed in a cooperative manner.

Second Embodiment

In the above-described first embodiment, although the occurrence of the emergency situation is determined by acquiring the alarm information from the notification server 3, in the embodiment, in addition to the alarm information, each vehicle detects surrounding circumstances, and the occurrence of the emergency situation is determined according to information regarding the surroundings. Since other configurations are the same as those in the above-described first embodiment, the same elements are represented by the same reference numerals, and description thereof will not be repeated.

Figure 11:
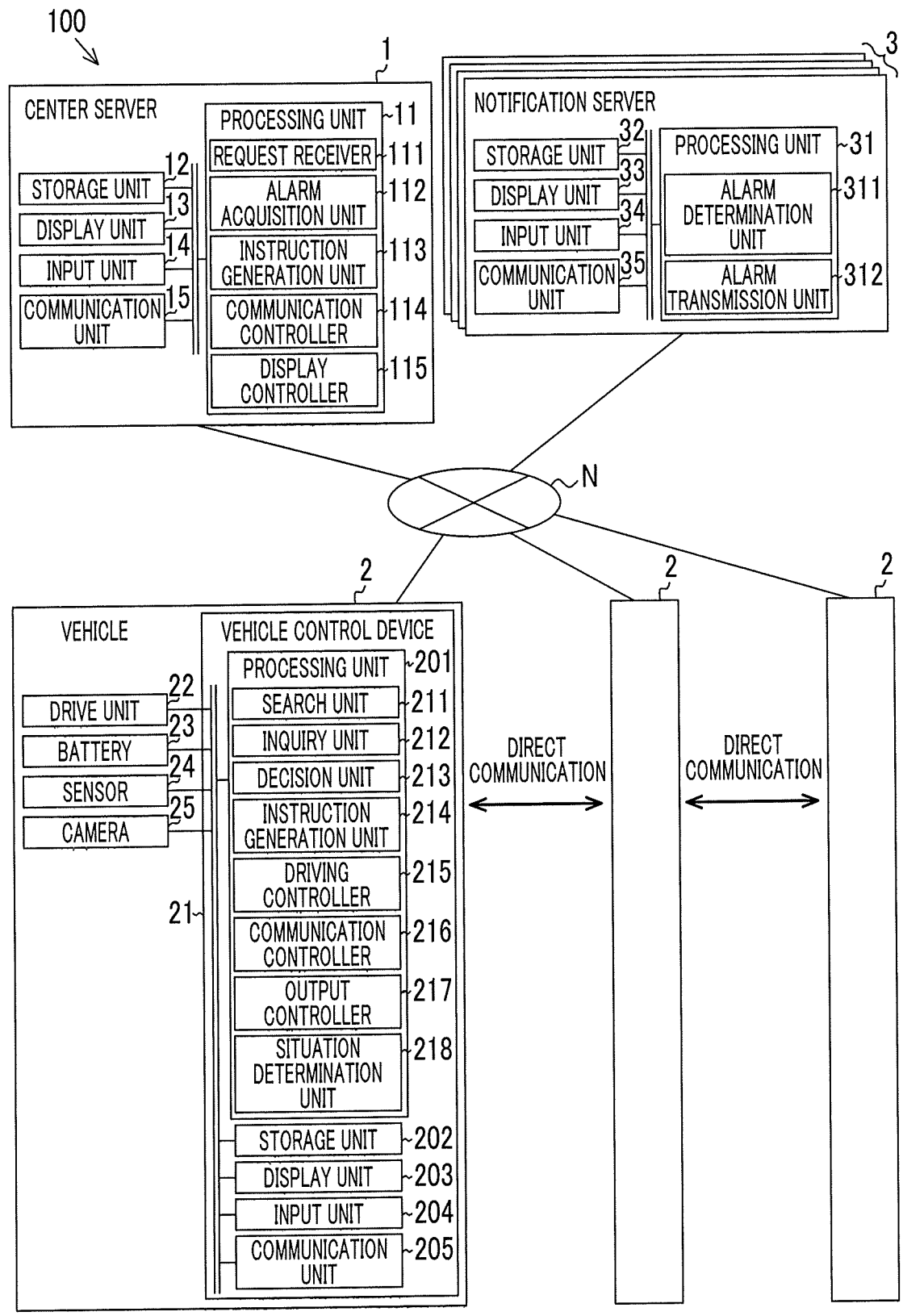
FIG. 11 is a configuration diagram of an emergency response system and the like according to a second embodiment.

FIG. 11 is a configuration diagram of an emergency response system 100 and the like of the second embodiment. In FIG. 11, the vehicle control device 21 further includes a circumstance determination unit 218 compared to the example of FIG. 1.

The circumstance determination unit 218 acquires circumstance information indicating surrounding circumstances by a camera or the sensor 24, such as LiDAR, and determines the occurrence of an emergency situation based on the circumstance information. For example, a situation, such as obstruction to traffic or obstruction to evacuation due to the occurrence of an obstacle caused by sinking of a road, flooding, or landslide, a traffic accident, or traffic signal failure, is detected.

In a case where determination is made that an emergency situation occurs, the circumstance determination unit 218 generates emergency information indicating the type of the occurred emergency situation, such as a blockage of a road, a traffic accident, or traffic signal failure, a place where the emergency situation occurs, and the like, and transmits the emergency information to the center vehicle 2 with the communication controller 216. In a case where the host vehicle 2 is the center vehicle 2, the emergency information may be stored in the memory, or the like to be usable by the instruction generation unit 214.

For example, in a case where detection is made by the sensor 24 that a hole having a width and a depth equal to or greater than predetermined values is formed in a road, the circumstance determination unit 218 generates emergency information indicating the occurrence of sinking (emergency situation) of the road, obstruction to traffic in the road, the road where sinking occurs, and the like. The circumstance determination unit 218 analyzes an image captured by the camera to extract a portion where a traffic signal is reflected, determines whether or not the traffic signal is lighted out, and in a case where the traffic signal is lighted out, generates emergency information including information regarding the occurrence of traffic signal failure or the position of a traffic signal. The circumstance determination unit 218 analyzes an image captured by the camera, and in a case where a road is flooded, a road is blocked due to landslide or rockfall, or a vehicle falls down or collides and blocks a road, generates emergency information including information regarding the occurrence of the situation and a place (road or the like) where the situation occurs.

Figure 12:
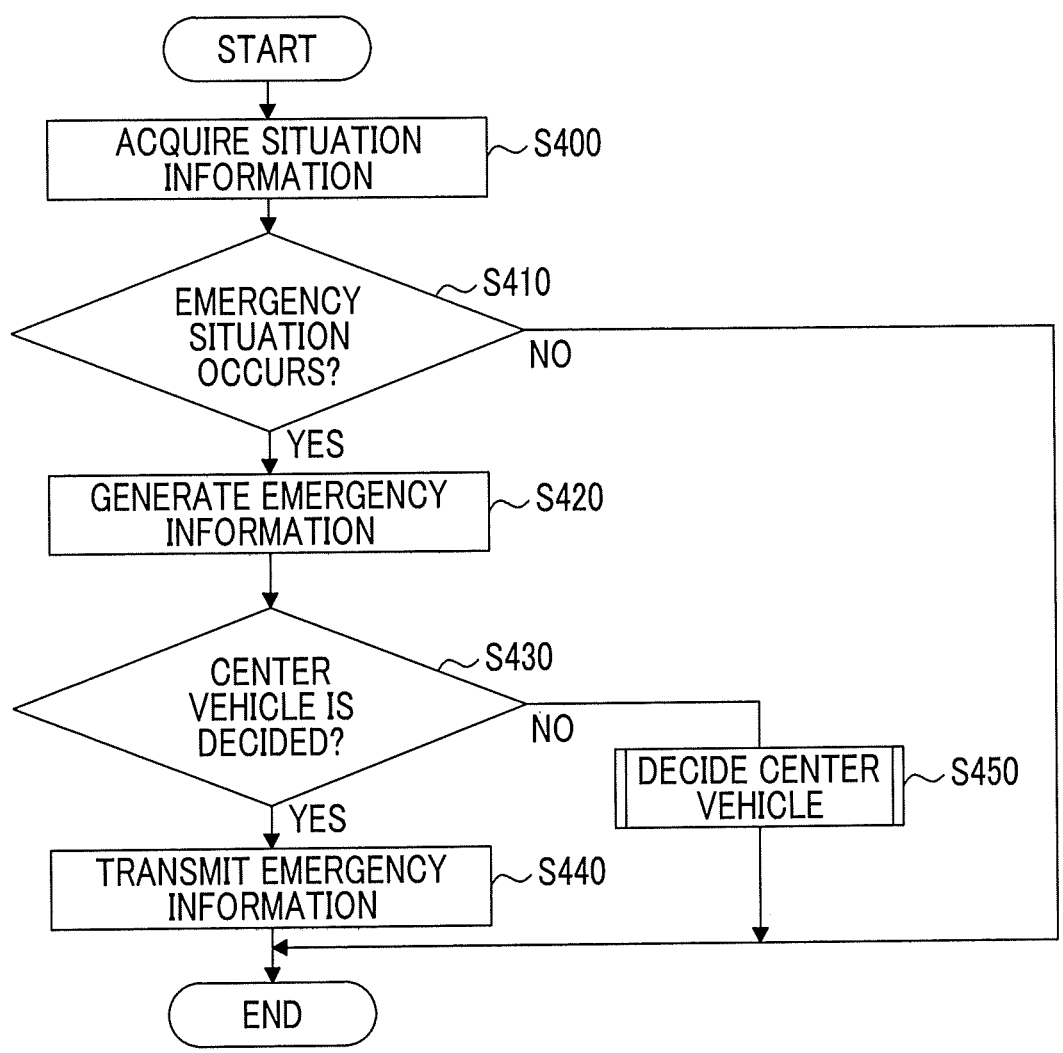
FIG. 12 is a diagram showing processing in which a vehicle control device determines the occurrence of an emergency situation according to surrounding circumstances.

FIG. 12 is a diagram showing processing in which the vehicle control device 21 determines the occurrence of an emergency situation according to surrounding circumstances. In a case where electric power is supplied, the vehicle control device 21 starts the processing of FIG. 12 and repeatedly executes the processing until electric power is cut off or until an instruction to stop is given. The processing of FIG. 12 is executed in parallel with the processing of FIGS. 6 and 7 described above.

In Step S400, the vehicle control device 21 acquires the circumstance information detected by the sensor 24.

In Step S410, the vehicle control device 21 determines whether or not an emergency situation occurs based on the circumstance information acquired in Step S400. For example, determination is made whether or not a situation, such as obstruction to traffic or obstruction to evacuation due to the occurrence of an obstacle caused by sinking of a road, flooding, or landslide, a traffic accident, or traffic signal failure, occurs.

In a case where negative determination is made in Step S410, the vehicle control device 21 ends the processing of FIG. 12, and in a case where affirmative determination is made, the vehicle control device 21 progresses to Step S420.

In Step S420, the vehicle control device 21 generates emergency information indicating the occurred emergency situation based on the circumstance information.

In Step S430, the vehicle control device 21 determines whether or not the center vehicle 2 is decided. In a case where affirmative determination is made in Step S430, the vehicle control device 21 progresses to Step S440 and transmits the emergency information generated in Step S420 to the center vehicle 2. In a case where the host vehicle 2 is the center vehicle 2, the emergency information may be stored in the memory, or the like to be usable in generating instruction information.

Figure 13:
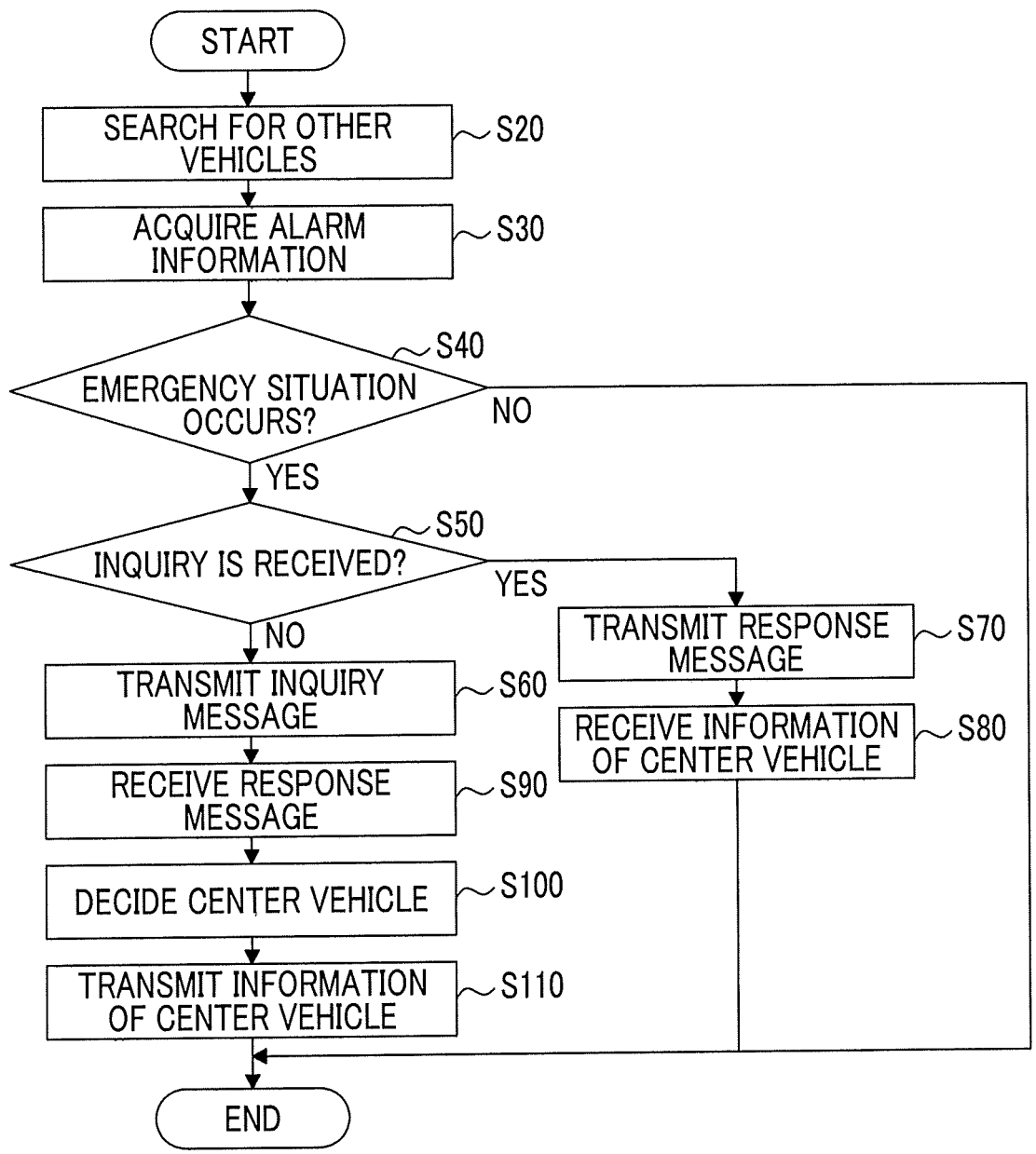
FIG. 13 is a diagram showing details of a step of deciding a center vehicle in FIG. 12.

On the other hand, in a case where negative determination is made in Step S430, the vehicle control device 21 progresses to Step S450 and executes the processing for deciding the center vehicle 2. FIG. 13 is a diagram showing the details of Step S450 of deciding the center vehicle 2 in FIG. 12. The processing of Steps S20 to S110 in FIG. 13 is the same as in FIG. 5.

Figure 14:
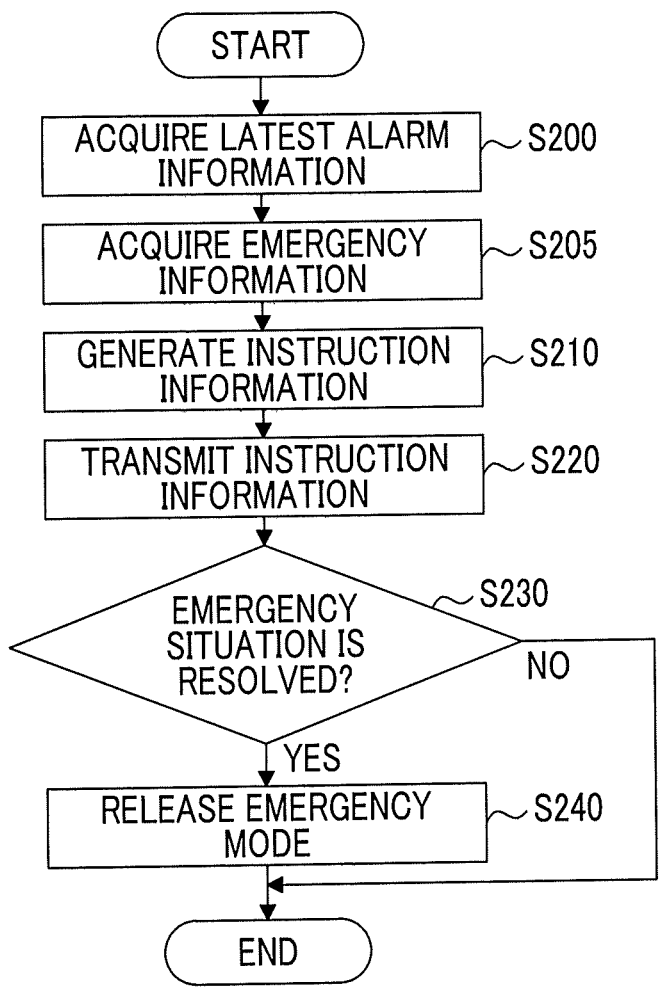
FIG. 14 is a diagram showing processing in which the center vehicle of the second embodiment transmits instruction information to other vehicles.

FIG. 14 is a diagram showing processing in which the center vehicle 2 of the embodiment transmits the instruction information to other vehicles 2. The vehicle control device 21 that is decided as the center vehicle starts the processing of FIG. 14 and acquires the emergency information from each vehicle 2 in Step S205, in addition to acquiring the latest alarm information from the notification server 3 in Step S200. For example, the vehicle control device 21 receives the emergency information transmitted from each vehicle 2 through the processing of FIG. 12 at any time, stores the emergency information in the memory, and reads and acquires the emergency information from the memory in Step S205.

In Step S210, the vehicle control device 21 generates instruction information indicating an operation to be performed by other vehicles 2 based on the acquired alarm information or emergency information. For example, in a case where sinking of a road or flooding occurs and traffic in the road is obstructed, the vehicle control device 21 generates instruction information for traffic suspension. In a case where traffic signal failure occurs, instruction information for displaying a traffic signal on the external display device for traffic control is generated.

In Step S220, the vehicle control device 21 transmits the instruction information generated in Step S210 to each vehicle 2.

In Step S230, the vehicle control device 21 determines whether or not the emergency situation is resolved. For example, in a case where the alarm information indicating that emergency situation ends is acquired from the notification server 3 or in a case where the emergency information indicating that the emergency situation ends is acquired from other vehicles 2, and in a case where communication with the center server 1 is disrupted, affirmative determination is made, and the vehicle control device 21 progresses to Step S240. Otherwise, negative determination is made, and the vehicle control device 21 ends the processing of FIG. 14.

In a case where the affirmative determination is made in Step S230, the vehicle control device 21 transmits information indicating the resolution of the emergency situation and deletes information regarding the emergency mode from the memory to release the emergency mode.

In the vehicle 2 that receives the instruction information, processing in which the vehicle control device 21 executes a work based on the instruction information is the same as in FIG. 7 described above.

Figure 15:
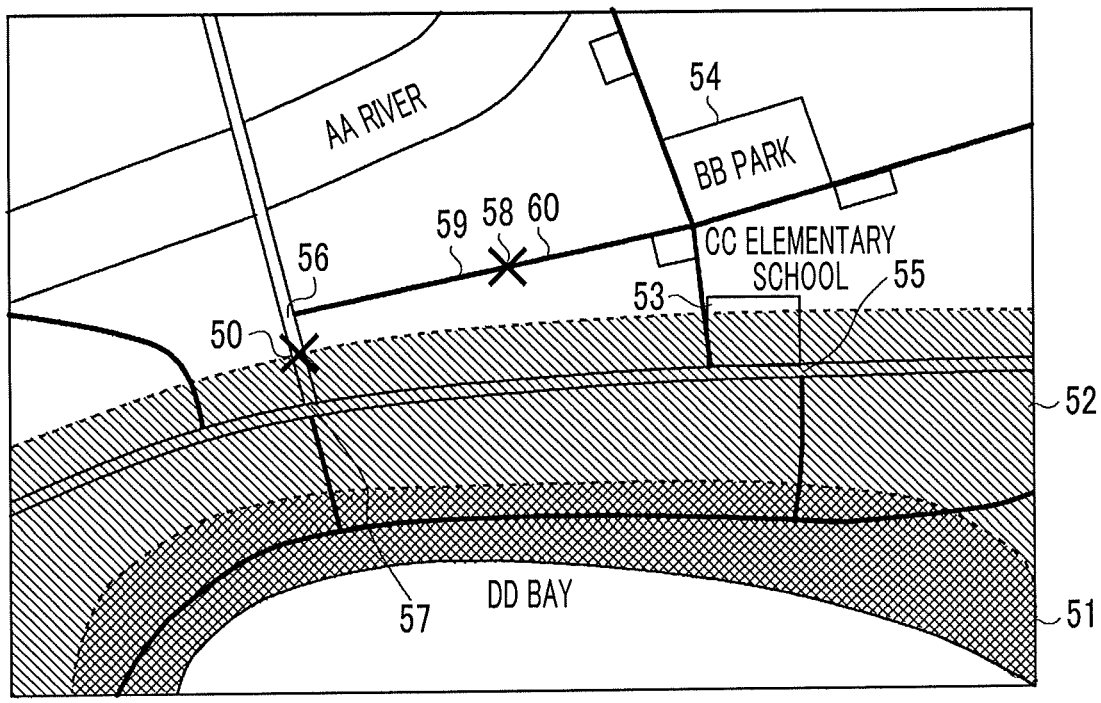
FIG. 15 is a diagram illustrating a specific example of a work that is executed in emergency.

FIG. 15 is a diagram illustrating a specific example of a work that is executed in emergency. In FIG. 15, a road 50 is a road where sinking of a road, flooding, or the like occurs and traffic is obstructed. The vehicle control device 21 specifies the road 50 where the emergency situation occurs based on the emergency information, obtains intersections 56, 57 to be nodal points of the road 50 from map information, generates instruction information for traffic suspension at the intersections 56, 57, and transmits the instruction information to other vehicles 2. The vehicle 2 that receives the instruction information for traffic suspension autonomously travels while setting the intersections 56, 57 indicated by the instruction information as a destination, and in a case of arriving at the intersections 56, 57, the vehicle 2 displays the occurrence of the emergency situation, such as sinking of the road or flooding, on the external display device, traffic suspension, a detour, and the like, and outputs a voice message "Traffic suspension. Please make a detour." or the like.

Figure 16:
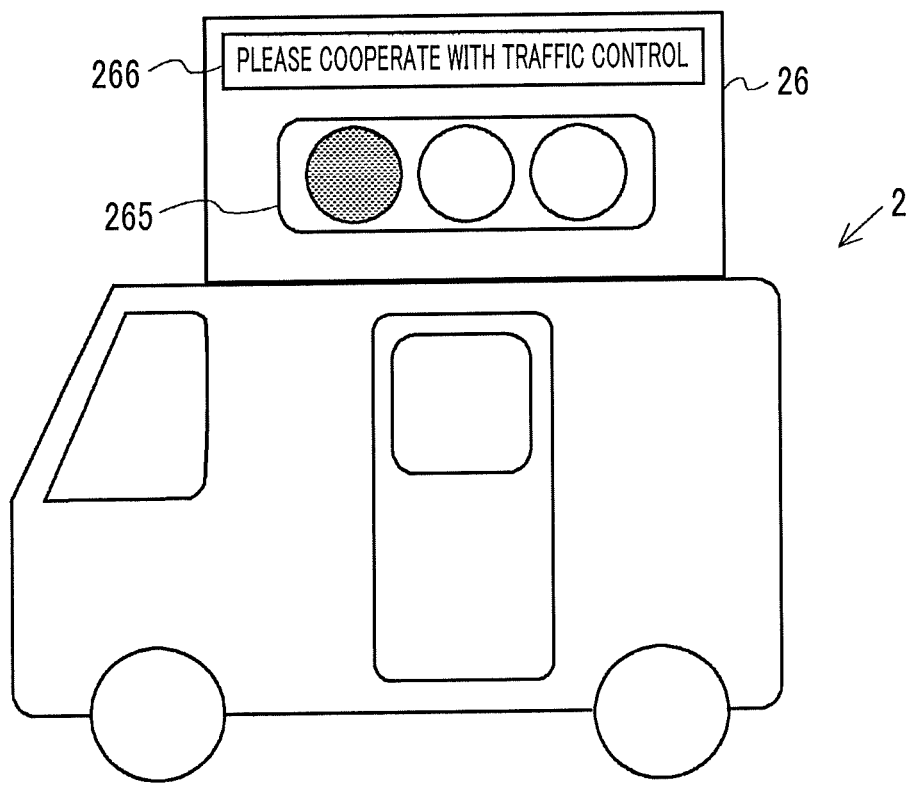
FIG. 16 is a diagram showing an example of a vehicle that prompts alternate traffic.

In FIG. 15, an accident scene 58 is a place where traffic on one-side lanes is obstructed due to an automobile accident. The vehicle control device 21 specifies the accident scene 58 where the emergency situation occurs based on the emergency information, obtains adjacent areas 59, 60 upstream and downstream of the accident scene 58 on the lanes on which traffic is obstructed, generates instruction information for one-side traffic in the adjacent areas 59, 60, and transmits the instruction information to other vehicles 2. The vehicle 2 that receives the instruction information autonomously travels while setting the adjacent areas 59, 60 indicated by the instruction information as a destination, and in a case of arriving at the adjacent areas 59, 60, as shown in FIG. 16, the vehicle 2 displays an image 265 modeled after a traffic signal or a message 266 "Please cooperate with one-side traffic" on the external display device 26, and alternately switches between a first signal traffic signal image 265 as a green signal and a second traffic signal image 265 as a red signal at every predetermined time. With this, vehicles that arrive at the accident scene 58 are made to pass through the accident scene 58 alternately.

In a case where traffic signal failure occurs, the vehicle 2 may be made to travel to a place of the traffic signal, and the traffic signal image may be displayed in the same manner as in FIG. 16, thereby performing traffic control.

In this way, according to the embodiment, each vehicle 2 can detect the emergency situation according to the surrounding circumstances and can perform the work according to the emergency situation in a cooperative manner. For example, in a case where a large scale earthquake occurs, various situations including not only a situation, such as a tsunami, in which an alarm is issued from the notification server 3, but also traffic signal failure accompanied by sinking of a road or blackout may occur, and according to the embodiment, each vehicle 2 can detect the situations and can quickly response to the situations.

Modification Example 1

In the first embodiment and the second embodiment described above, although communication of the instruction information and the like is performed through direct communication between the vehicles, the disclosure is not limited thereto, and in a modification example, communication is performed using other communication channels. For example, even though the communication network N is disconnected and communication between each vehicle 2 and the center server 1 is disrupted, in a case where a communication channel, such as a wide area wireless LAN or an ITS, is locally usable, communication with other vehicles 2 is performed using the usable communication channel. Since other configurations are the same as those in the first embodiment or the second embodiment described above, the same elements are represented by the same reference numerals, and description thereof will not be repeated.

Figure 17:
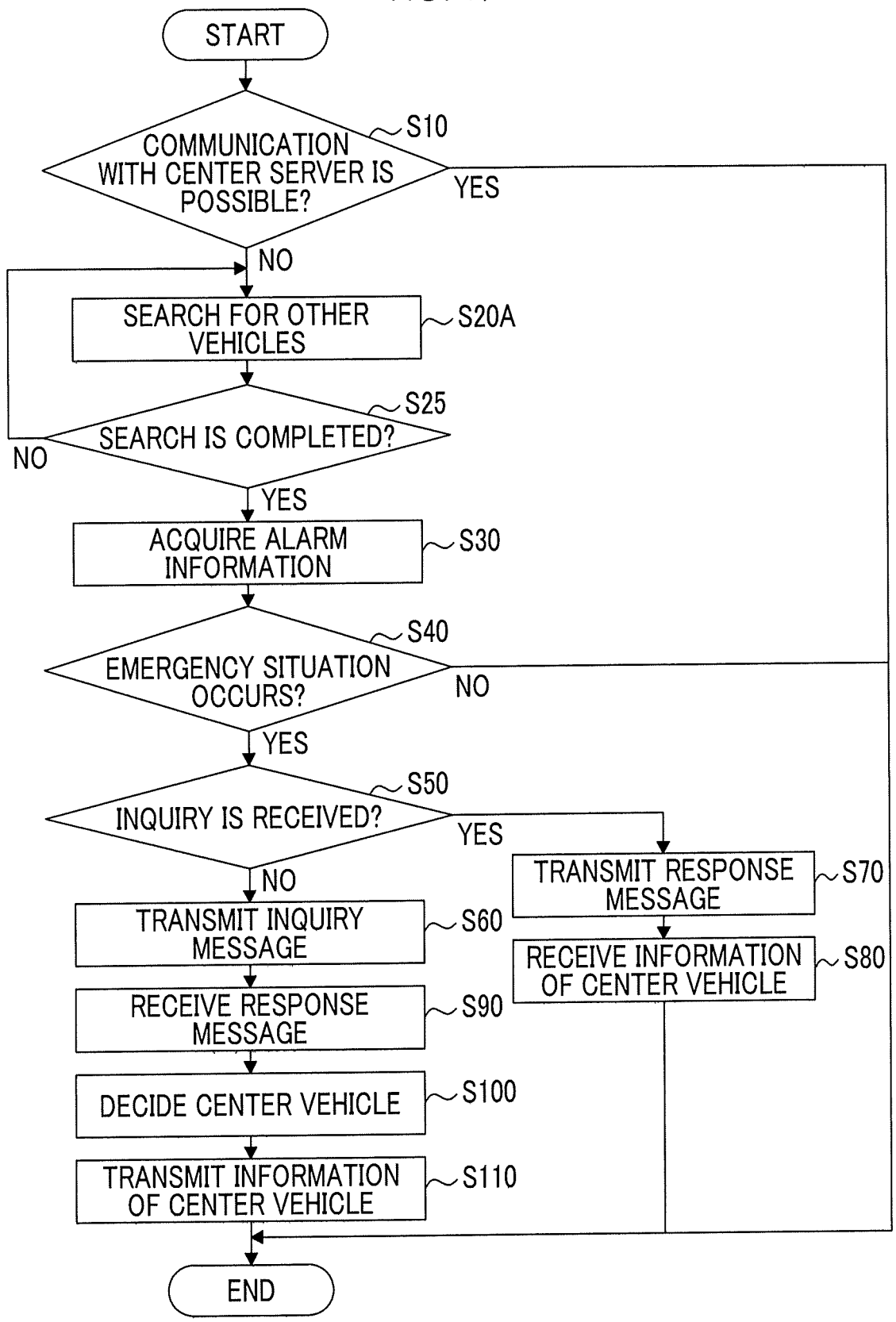
FIG. 17 is a diagram showing processing for deciding a center vehicle in a Modification Example 1.
Figure 18:
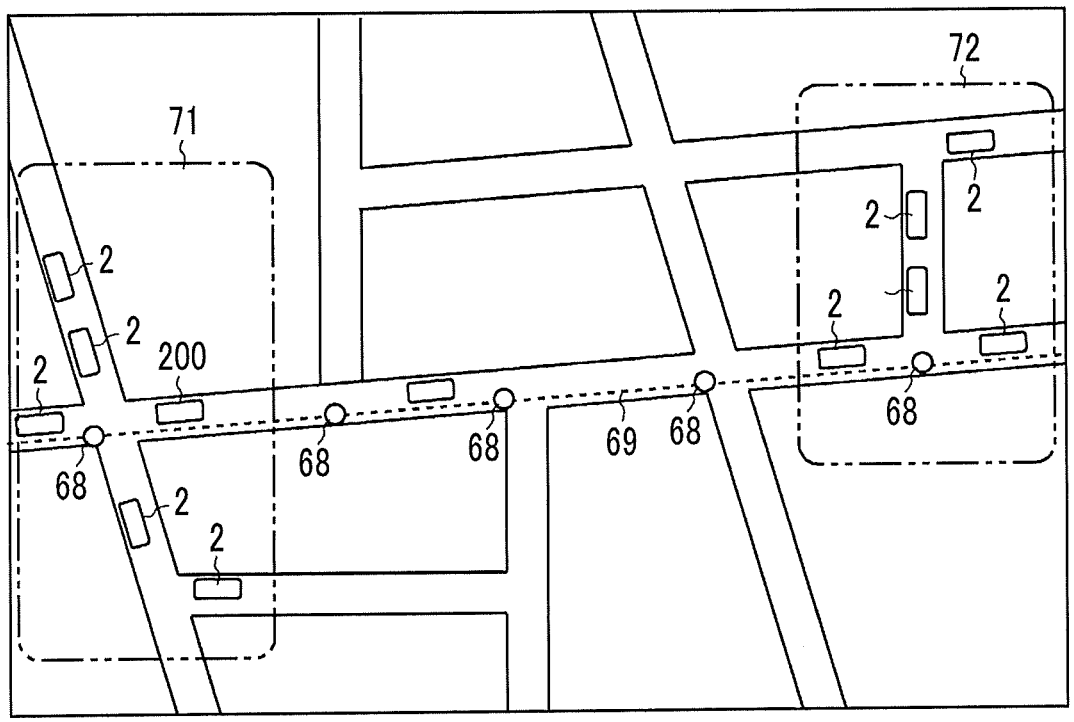
FIG. 18 is a diagram showing a communication example among vehicles in Modification Example 1.

FIG. 17 is a diagram showing processing for deciding a center vehicle of Modification Example 1, and FIG. 18 is a diagram showing a communication example between vehicles in Modification Example 1.

The vehicle control device 21 of the modification example executes the processing of FIG. 17 in a case where electric power is supplied. The processing of FIG. 17 is repeatedly executed until electric power is cut off or until an instruction to stop is given.

In Step S10, the vehicle control device 21 determines whether or not communication with the center server 1 is possible. In a case where affirmative determination is made in Step S10, the vehicle control device 21 ends the processing of FIG. 17, and in a case where negative determination is made, the vehicle control device 21 progresses to Step S20A.

The vehicle control device 21 includes a plurality of communication units, such as simplicity radio, a wide area LAN, and road-to-vehicle communication, and in Step S20A, searches for other vehicles 2 that can perform communication by selecting one of the communication units. For example, the vehicle control device 21 first searches for other vehicles 2 connectable to the host vehicle 2 in a peer-to-peer manner as other communicable vehicles 2 through direct communication between the host vehicle 2 and other vehicles 2 and direct communication between other vehicles.

In Step S25, the vehicle control device 21 determines whether or not the search using all communication units is completed. In a case where negative determination is made, the vehicle control device 21 returns to Step S20, and repeats the search by selecting a communication unit with which the search is not being performed. In a case where other vehicles 2 that can perform communication other than direct communication are searched, the vehicle 2 that is present at a position far from a place where an emergency situation occurs may also be searched; however, even though a vehicle that is too far from the place where the emergency situation occurs is searched, since the vehicle cannot quickly respond to the emergency situation, a place of a vehicle to be searched may be designated. For example, vehicles that are present within a predetermined range centering on the place where the emergency situation occurs, vehicles that are present in the same city, town, and village as the place where the emergency situation occurs, vehicles that are present at a place to arrive at the place where the emergency situation occurs within a predetermined time, and the like may be searched. For example, in a case where the search is performed in Step S20A, the vehicle control device 21 transmits a range (target range) of a place to be searched to other communicable vehicles 2, receives a reply from other vehicles 2 that are present within the target range, and searches for other vehicles 2 from which the reply is given.

In a case where affirmative determination is made in Step S25, the vehicle control device 21 progresses to Step S30. Processing after Step S30 is the same as the processing of FIG. 5 described above. That is, the center vehicle 2 is decided from among other searched vehicles 2 and the host vehicle 2, as in FIG. 6, the center vehicle transmits the instruction information to each vehicle 2, and as in FIG. 7, each vehicle 2 executes a work based on the instruction information.

In the example of FIG. 18, areas 71, 72 where direct communication is possible are distant from each other, and the vehicles 2 in the area 71 cannot perform direct communication with the vehicles 2 in the area 72. A network 69 for an ITS is provided in the areas 71, 72, and at least a part of the vehicles 2 in the areas 71, 72 accesses access points 68 of the network 69 and can perform communication with other vehicles 2 through the network 69. In a case where communication is possible through both of the network 69 and direct communication, any of the network 69 and direct communication may be selected according to a degree of congestion, an error rate, a communication system, or the like. For example, since the network 69 has many sections where communication is performed in a wired manner and is stable, the network 69 may be used for communication between the vehicles 2 with priority over direct communication.

In this way, in the modification example, it is possible to search for the vehicles 2 in the area 71 and the vehicles 2 in the area 72 as the communicable vehicles 2, and to decide a center vehicle 200 from among the vehicles 2 in the area 71 and the vehicles 2 in the area 72. In the example of FIG. 18, the center vehicle 2 is present in the area 71, and thus, cannot perform direct communication with the vehicles 2 in the area 72. Meanwhile, the center vehicle 2 can perform communication with the vehicles 2 in the area 72 through direct communication in the area 71 and the network 69 and transmit the instruction information. Therefore, according to the embodiment, even in the vehicles 2 in the area where direct communication cannot be performed, the instruction information is transmitted using another communication unit, whereby it is possible to operate the vehicles 2 in cooperative manner, and to make the vehicles 2 respond to the emergency situation.

Modification Example 2

In the embodiment and Modification Example 1 described above, although the center vehicle is decided at the time when the emergency situation occurs, and a group of the center vehicle 2 that transmits the instruction information and other vehicles 2 that receives the instruction information is formed, in the embodiment, in a case where other groups are near the group, and communication is possible, the groups may be integrated, and the center vehicle 2 is re-decided. Since other configurations are the same as those in the first embodiment, the second embodiment, or Modification Example 1 described above, the same elements are represented by the same reference numerals, and description thereof will not be repeated.

Figure 19:
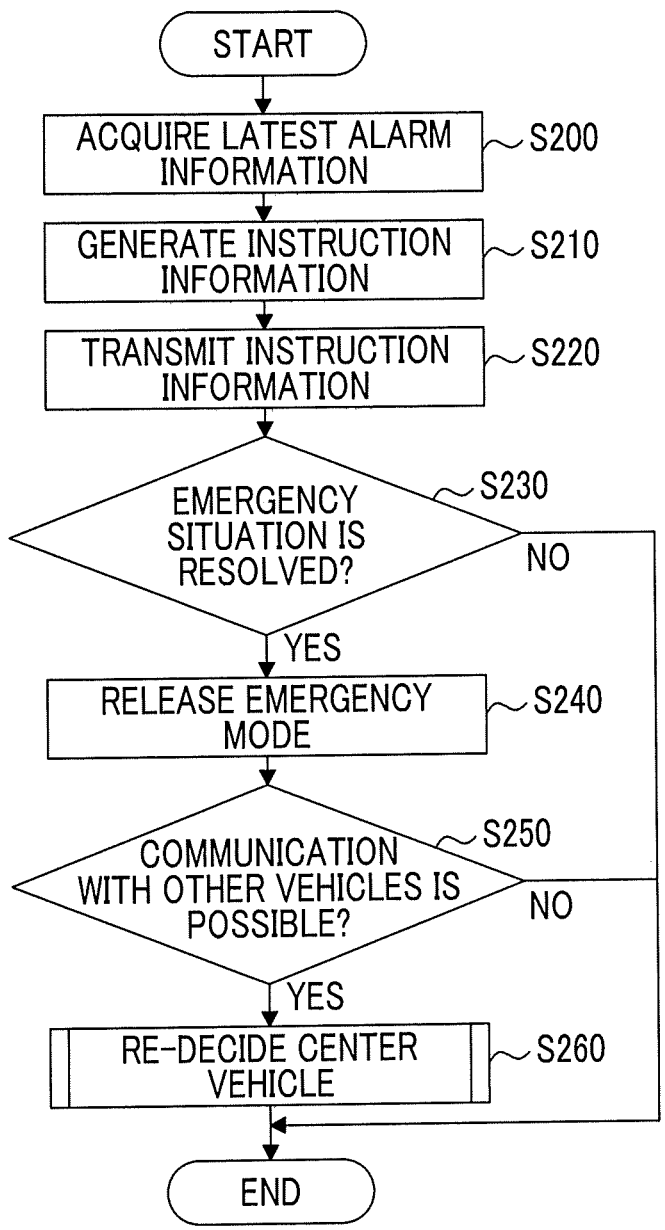
FIG. 19 is a diagram showing processing that is executed by a vehicle control device of a center vehicle in Modification Example 2.

FIG. 19 is a diagram showing processing that is executed by the vehicle control device 21 of the center vehicle 2 in Modification Example 2. The vehicle 2 that is decided as the center vehicle 2 through the processing of FIG. 5 or 17 starts the processing of FIG. 19 and repeatedly executes the processing until the emergency mode is released. In FIG. 19, processing of Steps S200 to S240 are the same as in FIG. 6 described above.

In Step S250, the vehicle control device 21 determines whether or not communication with another center vehicle 2 is possible, and in a case where negative determination is made, the vehicle control device 21 ends the processing of FIG. 19.

On the other hand, in a case where affirmative determination is made in Step S250, the vehicle control device 21 progresses to Step S260, and re-decides the center vehicle 2 from among the vehicles 2 belonging to another communicable group and the vehicles 2 belonging to the current group. The processing of Step S260 is the same as the processing of Steps S20 to S110 in FIG. 13 or 17.

In this way, in the modification example, in a case where the center vehicle 2 can perform communication with another center vehicle 2, the center vehicle that gives the instruction related to the intervention control is re-decided from among the host vehicle 2, other vehicles 2 that enable the intervention control from the host vehicle 2, another center vehicle 2, and other vehicles 2 that enable the intervention control from another center vehicle 2. With this, in a case where a plurality of groups is present adjacent to one other, the vehicle control device 21 of the example can integrate the groups, efficiently operate a plurality of vehicles 2 in a cooperative manner, and make the vehicles 2 respond to the emergency situation.

The processing or units described in the present disclosure can be freely combined and implemented as long as no technical contradiction arises.

Processing described to be executed by one device may be shared and executed by a plurality of devices. Alternatively, processing described to be executed by different devices may be executed by one device. In a computer system, a hardware configuration (server configuration) that implements each function may be flexibly changed.

The embodiments may also be implemented by supplying a computer program mounted with the functions described in the above-described embodiments to a computer and causing one or more processors in the computer to read and execute the program. Such a computer program may be provided to the computer by a non-transitory computer-readable storage medium connectable to a system bus of the computer or may be provided to the computer through a network. The non-transitory computer-readable storage medium includes, for example, any type of disk, such as a magnetic disk (a Floppy (Registered Trademark) disk, a hard disk drive (HDD), or the like), or an optical disk (a CD-ROM, a DVD, a Blu-ray disc, or the like), a read only memory (ROM), a random access memory (RAM), an EPROM, an EEPROM, a magnetic card, a flash memory, an optical card, or any type of medium suitable for storing electronic instructions.

What is claimed is:

1. A processing device that is mounted in a vehicle and is able to perform communication with a center server during a normal time, the processing device comprising a controller configured to execute:
   searching for one or a plurality of other vehicles with which a host vehicle is able to perform communication;
   in emergency where a situation of emergency occurs and communication with the center server is disrupted, inquiring the other vehicles searched by the search about whether or not to enable intervention control related to the situation;
   deciding a center vehicle giving an instruction related to the intervention control from among the other vehicles replying to enable the intervention control and the host vehicle; and
   controlling the at least one of the other vehicles replying to enable the intervention control and the host vehicle to operate in an emergency mode based on the instruction.

2. The processing device according to claim 1, wherein the controller is configured to search for the other vehicles connectable in a peer-to-peer manner through direct communication between the host vehicle and the other vehicles and direct communication between the other vehicles as the other communicable vehicles.

3. The processing device according to claim 1, wherein the controller is configured to acquire resource information indicating at least one of mounted equipment, a load, a remaining amount of fuel, a remaining capacity of a battery, and a communication circumstance for each of the host vehicle and the other vehicles, and decide the center vehicle based on the resource information.

4. The processing device according to claim 1, wherein, in a case where the host vehicle is the center vehicle, the controller transmits an instruction for instructing to operate in the emergency mode and perform at least one of route guidance, traffic control, movement, transportation of goods, and supply of electric power to the other vehicles.

5. The processing device according to claim 1, wherein the controller is configured to acquire circumstance information indicating surrounding circumstances from a sensor and determine the occurrence of the situation of emergency based on the circumstance information.

6. The processing device according to claim 1, wherein, in a case where the host vehicle is decided as the center vehicle, and the host vehicle is able to perform communication with another center vehicle, a center vehicle giving an instruction related to the intervention control is decided from among the host vehicle, the other vehicles enabling intervention control from the host vehicle, the other center vehicle, and the other vehicles enabling intervention control from the other center vehicle.

7. A processing method where a in which a computer, which is mounted in a vehicle and is able to perform communication with a center server during a normal time, executes:
   a step of searching for one or a plurality of other vehicles with which a host vehicle is able to perform communication;

a step of, in emergency where a situation of emergency occurs and communication with the center server is disrupted, inquiring the other vehicles searched by the search about whether or not to enable intervention control related to the situation;

a step of deciding a center vehicle giving an instruction related to the intervention control from among the other vehicles replying to enable the intervention control and the host vehicle; and a step of controlling the at least one of the other vehicles replying to enable the intervention control and the host vehicle to operate in an emergency mode based on the instruction.

8. A non-transitory computer-readable storage medium storing a computer program which, when executed by a computer that is mounted in a vehicle and is able to perform communication with a center server during a normal time, causes the computer to execute:

a step of searching for one or a plurality of other vehicles with which a host vehicle is able to perform communication;

a step of, in emergency where a situation of emergency occurs and communication with the center server is disrupted, inquiring the other vehicles searched by the search about whether or not to enable intervention control related to the situation;

a step of deciding a center vehicle giving an instruction related to the intervention control from among the other vehicles replying to enable the intervention control and the host vehicle; and a step of controlling the at least one of the other vehicles replying to enable the intervention control and the host vehicle to operate in an emergency mode based on the instruction.

* * * * *